(12) United States Patent
Kim

(10) Patent No.: US 10,726,270 B2
(45) Date of Patent: Jul. 28, 2020

(54) SELECTING MEDIA FROM MASS SOCIAL MONITORING DEVICES

(71) Applicant: Xinova, LLC, Seattle, WA (US)

(72) Inventor: Seungil Kim, Seoul (KR)

(73) Assignee: Xinova, LLC, Seattle, WA (US)

( * ) Notice: Subject to any disclaimer, the term of this patent is extended or adjusted under 35 U.S.C. 154(b) by 0 days.

(21) Appl. No.: 16/340,310

(22) PCT Filed: Oct. 21, 2016

(86) PCT No.: PCT/US2016/058207
§ 371 (c)(1),
(2) Date: Apr. 8, 2019

(87) PCT Pub. No.: WO2018/075068
PCT Pub. Date: Apr. 26, 2018

(65) Prior Publication Data
US 2019/0258862 A1    Aug. 22, 2019

(51) Int. Cl.
*G06K 9/00* (2006.01)
*G11B 27/031* (2006.01)
(Continued)

(52) U.S. Cl.
CPC ..... *G06K 9/00718* (2013.01); *G06K 9/00744* (2013.01); *G06K 9/00758* (2013.01);
(Continued)

(58) Field of Classification Search
CPC .......... G06K 9/00718; G06K 9/00744; G06K 9/00758; G06K 2009/00738;
(Continued)

(56) References Cited

U.S. PATENT DOCUMENTS

| 9,030,520 B2 | 5/2015 | Chu et al. |
| 2002/0105598 A1 | 8/2002 | Tai et al. |
(Continued)

FOREIGN PATENT DOCUMENTS

| EP | 0765084 A2 | 3/1997 |
| WO | 2008016360 A1 | 2/2008 |

OTHER PUBLICATIONS

International Search Report and Witten Opinion for International Application No. PCT/US2016/058207 dated Jan. 13, 2017, pp. 8.

*Primary Examiner* — Thai Q Tran
*Assistant Examiner* — Nienru Yang
(74) *Attorney, Agent, or Firm* — Hertzberg, Turk & Associates, LLC

(57) ABSTRACT

Technologies are generally described that relate to managing videos relating to events. An example technique can include analyzing audio content captured by an audio capture component and associated with video content captured by an image capture component to facilitate determining whether a defined event exists in the audio content. The technique also can include, in response to determining that the defined event exists in the audio content based on the analyzing, determining whether the image capture component captured event-related video content related to the defined event based on a result of analyzing a first direction in which the defined event occurred relative to the audio capture component in relation to a second direction that the image capture component was facing while capturing the video content, in accordance with a defined match criterion, to facilitate determining whether to present, emphasize, or select at least the video content.

27 Claims, 13 Drawing Sheets

(51) Int. Cl.
*H04M 1/725* (2006.01)
*H04N 7/18* (2006.01)
*G08B 13/196* (2006.01)
*G08B 13/16* (2006.01)

(52) U.S. Cl.
CPC ....... *G11B 27/031* (2013.01); *H04M 1/72538* (2013.01); *H04N 7/183* (2013.01); *G06K 2009/00738* (2013.01); *G08B 13/1672* (2013.01); *G08B 13/19691* (2013.01)

(58) Field of Classification Search
CPC . G11B 27/031; H04M 1/72538; H04N 7/183; G08B 13/1672; G08B 13/19691
USPC ........................................................ 386/241
See application file for complete search history.

(56) References Cited

U.S. PATENT DOCUMENTS

| | | | |
|---|---|---|---|
| 2004/0161133 A1 | 8/2004 | Elazar et al. | |
| 2012/0062729 A1* | 3/2012 | Hart | G06F 1/1626 348/135 |
| 2012/0307048 A1 | 12/2012 | Abrahamsson et al. | |
| 2014/0267704 A1 | 9/2014 | Huang et al. | |
| 2015/0070506 A1 | 3/2015 | Chattopadhyay et al. | |
| 2016/0005435 A1* | 1/2016 | Campbell | H04N 9/806 386/240 |
| 2016/0210097 A1 | 7/2016 | Forutanpour et al. | |

* cited by examiner

SELECTING MEDIA FROM MASS SOCIAL MONITORING DEVICES

CROSS-REFERENCE TO RELATED APPLICATIONS

The present application is a U.S. National Stage filing under 35 U.S.C. § 371 of International Application PCT/US2016/058207, filed Oct. 21, 2016 and entitled "SELECTING MEDIA FROM MASS SOCIAL MONITORING DEVICES." The International Application, including any appendices or attachments thereof, is incorporated by reference herein in its entirety.

TECHNICAL FIELD

The subject disclosure relates generally to selecting media from mass social monitoring devices.

BACKGROUND

Users can use video recording devices (e.g., mobile phones, computers, or electronic tablets having video recording capability, video cameras, vehicles equipped with video recording equipment) to record events. A method for crowd monitoring for events (e.g., for temporary or large-scale events) can involve users who participate in or attend an event and record (e.g., voluntarily record) videos using their video recording devices. The videos can comprise respective video and/or audio content that may relate to the event, and may capture various parts of the event from various perspectives of the video recording devices of the users. The users can send (e.g., voluntarily send) their videos to, for example, a centralized center, where such videos may be monitored or reviewed. However, if too many videos are transmitted to the centralized center, it can be difficult to select videos from the many videos that contain desirable (e.g., meaningful or significant) information. Also, if too many users simultaneously transmit videos with respect to a particular place (e.g., at the event), this may impact or overload communication network bandwidth. Further, as communicating the videos can result in data usage that may incur a cost with regard to subscriptions for communication services of users, some users may not desire to accept having to pay a data charge in connection with transmitting videos, such as videos that may only contain insignificant information, to the centralized center.

SUMMARY

In various, non-limiting embodiments, systems, devices, methods and/or computer-readable storage media that managing videos relating to events are described herein.

In some example embodiments, a method can comprise analyzing, by a device comprising a processor, audio content captured by an audio capture component and associated with video content captured by an image capture component. The method also can comprise, in response to determining that a defined event exists in the audio content based on the analyzing, determining, by the device, whether the image capture component captured event-related video content related to the defined event based on a result of analyzing a first direction in which the defined event occurred relative to the audio capture component in relation to a second direction that the image capture component was facing while capturing the video content.

In another example embodiment, a system can include a memory storing executable components. The system also can comprise a processor, coupled to the memory, operable to execute or facilitate execution of one or more of the executable components. The executable components can comprise an analyzer component configured to analyze audio content captured by an audio capture component and associated with video content captured by an image capture component. The executable components also can comprise a media management component configured to, in response to determining that a defined event exists in the audio content based on the analysis of the audio content, determine whether the image capture component captured event-related video content relating to the defined event based on a result of analyzing a first direction in which the defined event occurred relative to the audio capture component relative to a second direction that the image capture component was facing while capturing the video content.

In yet another example embodiment, a machine-readable storage device can comprise executable instructions that, in response to execution, cause a system comprising a processor to perform operations. The operations can include: analyzing audio information captured by an audio capture component and associated with video information captured by an image capture component; and in response to determining that a defined event exists in the audio information based on the analyzing, determining whether the image capture component captured event-related video information related to the defined event based on a result of analyzing a first direction in which the defined event occurred relative to the audio capture component in relation to a second direction that the image capture component was facing while capturing the video information.

The foregoing summary is illustrative only and is not intended to be in any way limiting. In addition to the illustrative aspects, embodiments, and elements described above, further aspects, embodiments, and elements will become apparent by reference to the drawings and the following detailed description.

BRIEF DESCRIPTION OF THE FIGURES

The foregoing and other elements of this disclosure will become more fully apparent from the following description and appended claims, taken in conjunction with the accompanying drawings. Understanding that these drawings depict only several embodiments in accordance with the disclosure and are, therefore, not to be considered limiting of its scope, various non-limiting embodiments are further described with reference to the accompanying drawings in which:

DETAILED DESCRIPTION

Figure 1:
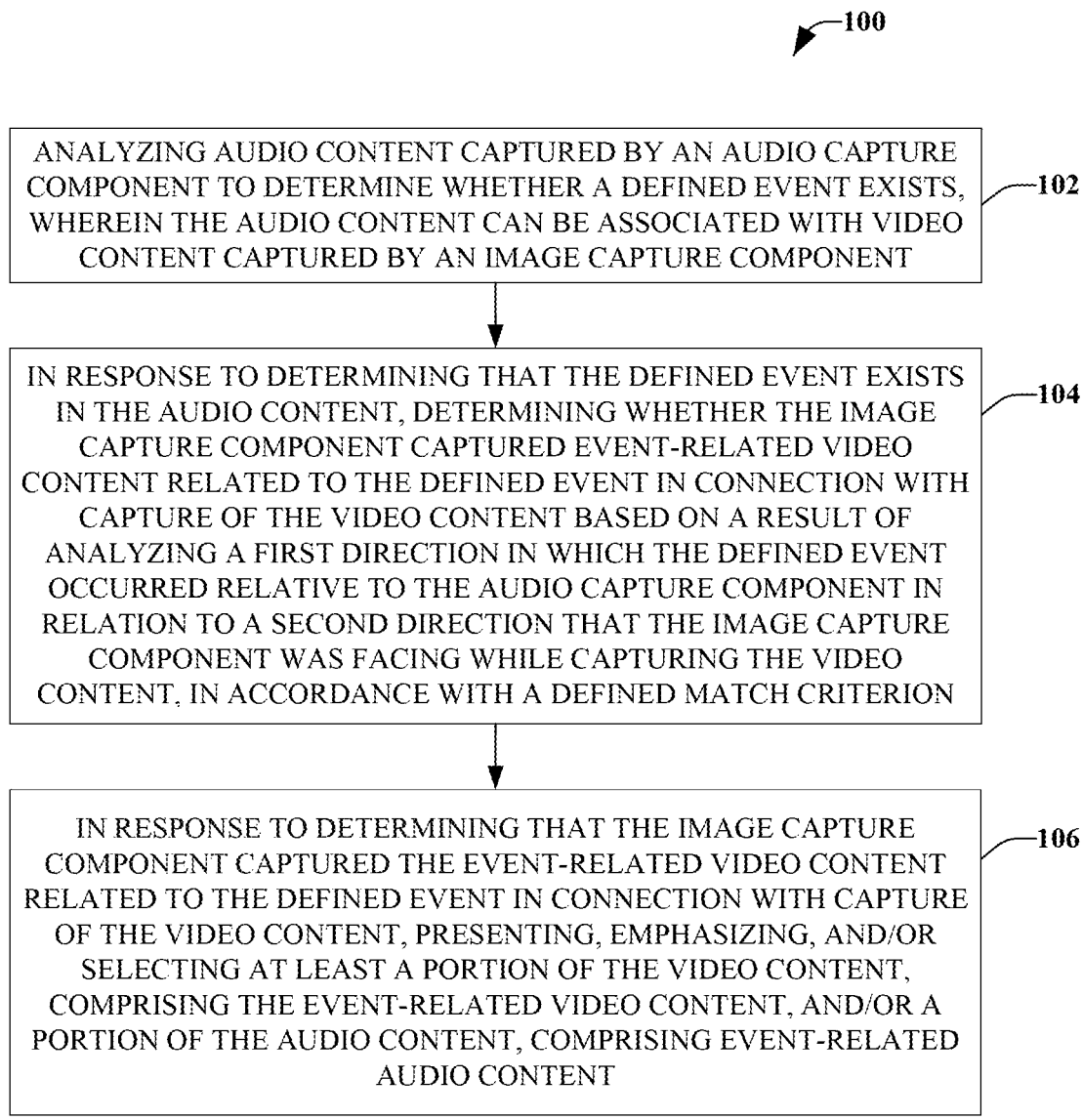
FIG. 1 illustrates an example, non-limiting embodiment of a method that can manage videos relating to events, in accordance with various aspects and embodiments of the disclosed subject matter.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, may be arranged, substituted, combined, separated, and designed in a wide variety of different configurations, all of which are explicitly contemplated herein.

During an event, users can use respective recording devices to record videos that may relate to the event. The users may send (e.g., voluntarily send) their videos to, for example, a centralized system, where such videos may be monitored or reviewed. However, communication of too many videos (e.g., undesirable or unnecessary videos) to the centralized system can make it difficult to select videos from the many videos that contain desirable (e.g., meaningful or significant) information, can overload bandwidth of the communication network, and/or can result in data usage that may incur a cost (e.g., an undesirable or unnecessary cost) with regard to subscriptions for communication services of users. It can therefore be desirable to identify and select one or more videos, which are meaningful or have significance, among a group (e.g., a relatively large number) of videos.

To address these and/or other issues, one or more embodiments of the present disclosure provide techniques for managing videos relating to events. An example technique can include analyzing audio content captured by an audio capture component of a device to facilitate determining whether a defined event (e.g., gunfire, an explosion, a vehicle collision, a scream by a person, a noise relating to a physical attack on the person) exists in the audio content. The audio content can be associated with video content captured by an image capture component of the device. The technique also can include, in response to determining that the defined event exists in the audio content based on the analyzing, determining whether the image capture component captured event-related video content related to the defined event in connection with capture of the video content based on a result of analyzing a first direction associated with the audio capture component and a second direction associated with the image capture component, in accordance with defined match criteria. The first direction can be or can relate to a direction in which the defined event occurred relative to the audio capture component. The second direction can be or can relate to a respective direction that the image capture component was facing while capturing the video content. The technique further can comprise determining whether to present, emphasize, or select the video content and/or audio content relating to the defined event based on a result of the determining whether the image capture component captured event-related video content related to the defined event.

In some embodiments, a device (e.g., mobile phones, computers, or electronic tablets having video recording capability, video cameras, vehicles equipped with video recording equipment) of a user can be used to record the video content and/or the audio content relating to the defined event. The device can comprise a media management component that can employ the technique and/or other techniques to determine whether the image capture component of the device captured the event-related video content related to the defined event in connection with capture of the video content. For instance, the media management component can determine whether the image capture component of the device captured the event-related video content related to the defined event based on the result of analyzing the first direction associated with the audio capture component in relation to the second direction associated with the image capture component, in accordance with the defined match criteria. Based on a result of determining whether the image capture component of the device captured the event-related video content related to the defined event, the media management component can facilitate determining whether to present, emphasize, or select the video content and/or the audio content relating to the defined event. For example, in response to determining that the video recording device captured the event-related video content related to the defined event, the media management component can determine that at least a portion of the video content, comprising the event-related video content, and/or a portion of the associated audio content is to be presented (e.g., transmitted) to a media monitoring system.

In other embodiments, a media monitoring system can comprise its own media management component. The media management component of the media monitoring system can employ the disclosed techniques and/or the other techniques to determine, with regard to a video received from the device, whether the image capture component of the device captured the event-related video content related to the defined event based on the result of analyzing the first direction associated with the audio capture component of the device in relation to the second direction associated with the image capture component, in accordance with the defined match criteria. The media management component can facilitate determining whether to present, emphasize, or select the video content and/or the audio content relating to the defined event, based on a result of determining whether the image capture component of the device captured the event-related video content related to the defined event. For example, if the media management component determines that the video contains the event-related video content, the media management component can determine that at least a portion of the video content, comprising the event-related video content, and/or a portion of the associated audio content is to be presented (e.g., displayed) on a display screen, an indicator (e.g., a match indicator) is to be presented in connection with presenting the portion of the video content on the display screen, and/or the portion of the video content is to be selected (e.g., for further review).

The media management component of the media monitoring system also can employ the disclosed techniques and/or the other techniques to analyze various videos relating to the defined event that are received from various devices to facilitate identifying one or more of the videos that comprise respective video content that comprise the event-related video content. The media management component of the media monitoring system can present or select one or more respective portions of the respective video content and/or one or more respective portions of respective audio content of the one or more videos on one or more display screens. The media management component also can present one or more indicators in connection with the one or more respective portions of the respective video content being presented on the one or more display screens.

These and other aspects and embodiments of the disclosed subject matter will now be described with respect to the drawings.

FIG. 1 illustrates an example, non-limiting embodiment of a method 100 that can manage videos relating to events, in accordance with various aspects and embodiments of the disclosed subject matter. In some embodiments, the method 100 can be associated with or employed by a device (e.g., a mobile or smart phone, a computer, an electronic tablet, a video camera, or video recording equipment integrated with a vehicle). With regard to the video recording equipment integrated with the vehicle (e.g., an automobile, a truck, a bus, a train, etc.), for example, the video recording equipment can capture video (e.g., video information or content) and/or audio (e.g., audio information or content) relating to a vehicle accident, which may or may not directly involve the vehicle having the video recording equipment, wherein the video recording equipment can be operating in the vehicle near a site of the vehicle accident and in a direction of the site at or near a time when the vehicle accident occurs. In other embodiments, the method 100 can be associated with or employed by a media monitoring system that can manage videos received from devices, such as the device.

The method 100 in FIG. 1 can be implemented using, for example, any of the systems, such as a system 200 (of FIG. 2), a system 500 (of FIG. 5), etc., described herein below. The method 100 may include one or more operations, functions, or actions as illustrated by one or more of blocks 102, 104 and/or 106.

At block 102, audio content captured by an audio capture component can be analyzed to determine whether a defined event exists, wherein the audio content can be associated with video content captured by an image capture component. The audio content can be analyzed to facilitate determining whether the defined event exists (e.g., is present) in the audio content. The defined event can comprise, for example, gunfire, an explosion (e.g., a bomb explosion, a chemical explosion, an electrical or magnetic related explosion, a mechanical related explosion (e.g., bursting of a container, such as an overheated container), a volcanic explosion, a nuclear explosion, or other type of explosion), a vehicle collision, a scream by a person, a noise relating to a physical attack on the person, or other type of event that can be considered meaningful or significant to a user and/or an entity. The defined event (e.g., a key or significant event) can be detected, for example, by analyzing, in the audio content, a pattern of features (e.g., characteristics, or attributes), such as a short-time energy (STE) value, a zero-crossing rate (ZCR), a linear predictive coding (LPC) coefficient, or a mel-frequency cepstral coefficient (MFCC), associated with the audio content.

The audio capture component and the video capture component can be part of the device (e.g., a mobile or smart phone, a computer, an electronic tablet, a video camera, or a vehicle equipped with video recording equipment), wherein the device can be a mobile device or a stationary device. The audio capture component can comprise one or more microphones that can be used to receive or capture sounds in proximity to the one or more microphones. The video capture component can comprise one or more camera lenses that can be employed to receive or capture visual images in the field of view of the one or more camera lenses. Block 102 can be followed by block 104.

At block 104, in response to determining that the defined event exists in the audio content based on a result of the analyzing of the audio content, a determination can be made regarding whether the image capture component captured event-related video content related to the defined event in connection with capture of the video content based on a result of analyzing a first direction in which the defined event occurred relative to the audio capture component in relation to a second direction that the image capture component was facing while capturing the video content, in accordance with a defined match criteria. A result of the determining whether the image capture component captured the event-related video content can be used to facilitate determining whether to present, emphasize, or select the video content and/or audio content relating to the defined event.

As part of the analyzing of the audio content, the first direction in which the defined event occurred relative to the audio capture component can be determined or estimated. The first direction in which the defined event occurred relative to the audio capture component can be determined or estimated, for example, by determining a time difference of arrival (TDOA) between two or more audio signals relating to the defined event being received by the audio capture component. Additionally or alternatively, the first direction in which the defined event occurred relative to the audio capture component can be determined or estimated by triangulating a source of a sound associated with the defined event in the audio content based on analyzing a first portion, a second portion, and a third portion of the audio content. The first portion can be received via a first microphone of the audio capture component, the second portion can be received via a second microphone of the audio capture component, and the third portion can be received via a third microphone of the audio capture component. The first portion of the audio content can comprise the sound associated with the defined event and/or other sounds as sensed or captured by the first microphone. The second portion of the audio content can comprise the sound and/or the other sounds as sensed or captured by the second microphone. The third portion of the audio content can comprise the sound and/or the other sounds as sensed or captured by the third microphone.

The video content can be analyzed to determine the second direction that the image capture component was facing while receiving or capturing the video content. A field of view of the image capture component (e.g., the field of view of one or more lenses of the image capture component) can be determined (e.g., with respect to the second direction) based on a result of the analyzing of the video content. The first direction in which the defined event occurred relative to the audio capture component can be compared to the second direction and/or the field of view to determine whether the defined event occurred within the field of view of the image capture component. If the first direction is within the field of view of the image capture component, it can be determined that the image capture component captured the event-related video content related to the defined event in connection with the capture of the video content, in accordance with a defined match criteria. The defined match criteria can comprise one or more defined match criterion that can indicate or relate to when the first direction associated with the audio content matches or substantially matches the second direction associated with the video content. If the first direction is not within the field of view of the image capture component, it can be determined that the image capture component did not capture the event-related video content related to the defined event in connection with capture of the video content. Block 104 can be followed by block 106.

At block 106, in response to determining that the image capture component captured the event-related video content, at least a portion of the video content, comprising the event-related video content, and/or a portion of the audio content, comprising event-related audio content, can be presented, emphasized (e.g., via an indicator, such as a match indicator, that can be presented in connection with the portion of the video content), or selected. For instance, in response to determining that the image capture component captured the event-related video content related to the defined event, the device can present (e.g., transmit) at least the portion of the video content, comprising the event-related video content, and/or the portion of the audio content, comprising the event-related audio content, to the media monitoring system, which can receive (e.g., collect) videos relating to the defined event from various devices, such as the device. The portion of the video content can comprise the event-related video content, and, when desired (e.g., by a media management component of the device, a user of the device, or the media monitoring system) also can comprise another part(s) of the video content that can cover a period of time prior to the event-related video content and/or can cover another period of time that occurred after the event-related video content to facilitate providing context and/or additional information relating to the defined event. The portion of the audio content can comprise the event-related audio content, and, when desired, also can comprise another part(s) of the audio content that can cover the period of time prior to the event-related audio content and/or can cover the other period of time that occurred after the event-related audio content to facilitate providing context and/or additional information relating to the defined event.

Additionally or alternatively, in response to determining that the image capture component captured the event-related video content related to the defined event, the device can emphasize the video content, for example, by highlighting the video content, or the portion of the video content, or by presenting the indicator (e.g., the match indicator) that can indicate the video content contains the event-related video content. The indicator can indicate, for instance, that the first direction associated with the audio content matched or substantially matched the second direction associated with the video content.

When the media monitoring system employs the method 100, for example, in connection with analyzing a received video (e.g., a video received from the device), in response to determining that the image capture component captured the event-related video content related to the defined event, at least the portion of the video content, comprising the event-related video content, and/or the portion of the audio content, comprising the event-related audio content, can be presented (e.g., displayed on a display screen of the media monitoring system). Additionally or alternatively, in response to determining that the image capture component captured the event-related video content, in connection with (e.g., in connection with the presentation of) at least the portion of the video content, comprising the event-related video content, an emphasis indicator, such as the indicator (e.g., the match indicator), a highlighting of the event-related video content, or other type of indicator, can be presented. Additionally or alternatively, in response to determining that the image capture component captured the event-related video content, at least the portion of the video content, comprising the event-related video content, and/or the portion of the audio content, comprising the event-related audio content, can be selected for presentation on the display screen and/or for further review (e.g., by a person monitoring videos in connection media monitoring).

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 2:
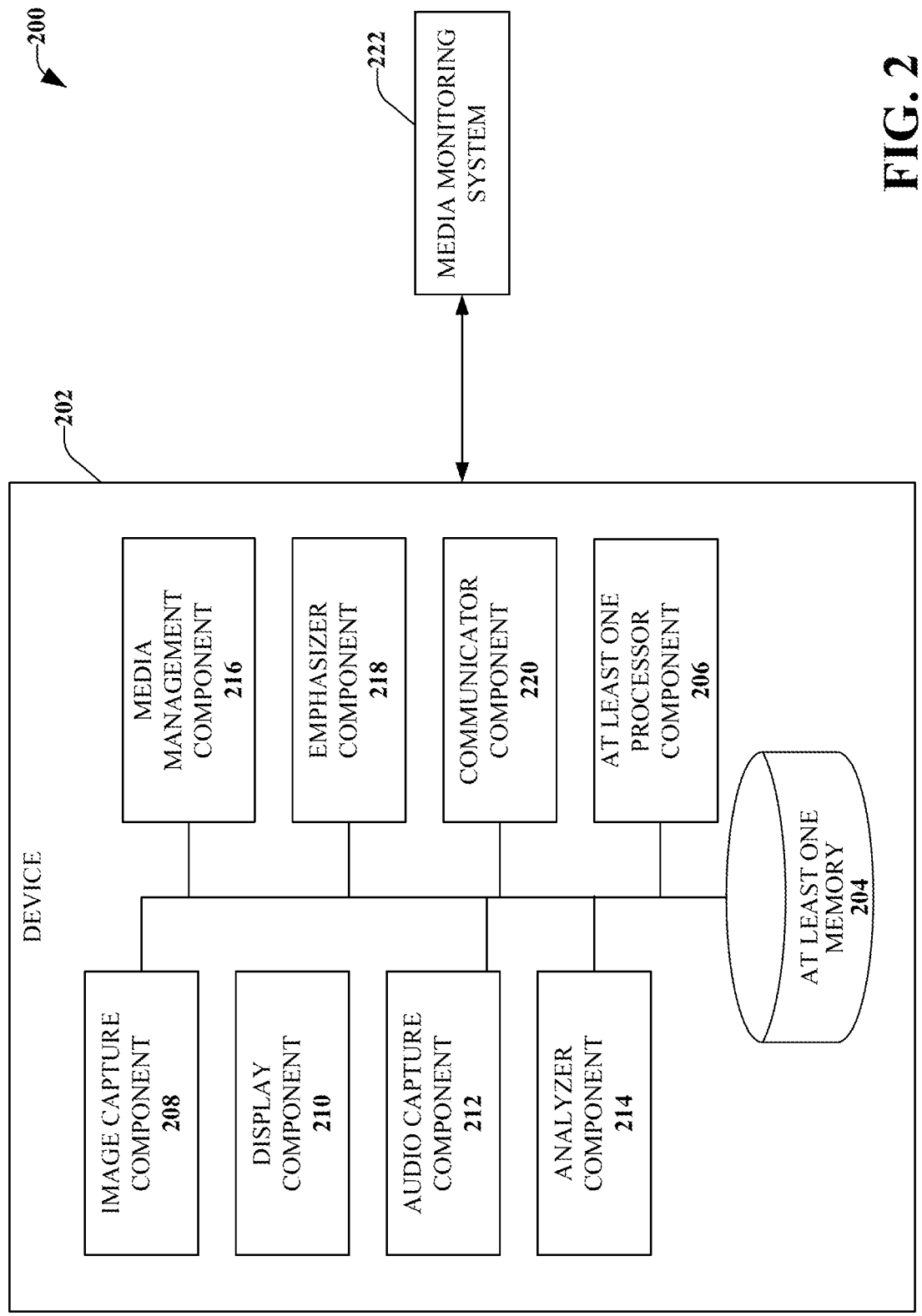
FIG. 2 illustrates an example, non-limiting embodiment of a system that can manage videos associated with events, in accordance with various aspects and embodiments of the disclosed subject matter.

Turning now to FIG. 2, illustrated is an example, non-limiting embodiment of a system 200 that can manage videos associated with events, in accordance with various aspects and embodiments of the disclosed subject matter. In some embodiments, the system 200 can be associated with one or more applications, such as but not limited to, a media management application, a multimedia application, a user interface application, a controller application, a user input application, a data collection application, an authentication application, a security application, or another type of application.

The system 200 can comprise a device 202 (e.g., a mobile or smart phone, a computer, an electronic tablet, a video camera, or video recording equipment integrated with a vehicle) that can be employed to capture and record video and audio of desired events. With regard to the video recording equipment integrated with the vehicle (e.g., an automobile, a truck, a bus, a train, etc.), for example, the video recording equipment can be operating in the vehicle near a site of a vehicle accident and in a direction of the site at or near a time when the vehicle accident occurs. The video recording equipment can capture video (e.g., video information or content) and/or audio (e.g., audio information or content) relating to a vehicle accident, which may or may not directly involve the vehicle having the video recording equipment.

The device 202 can be a mobile device (e.g., mobile phone, electronic tablet) or a stationary device. The stationary device can be or can comprise, for example, a stationary or fixed video camera (e.g., a video surveillance camera) that can be in a fixed place, wherein the video camera can be attached to a stationary object (e.g., a wall, a ceiling, or other stationary object). The stationary or fixed video camera can capture video (e.g., via one or more lenses of the video camera) and/or audio (e.g., via one or more microphones or audio sensors of the video camera) in a coverage area covered by the video camera. The coverage area can be, for example, a room (e.g., office, living room), or part of the room, in a building or a home, a parking lot or a driveway, or portion thereof, associated with the building or the home, or another desired area. The video camera can be fixed such that a camera lens of the video camera does not move. Alternatively, the video camera, while stationary in that it can be attached to the stationary object, can move along a hinge or a pin to scan (e.g., scan left to right, right to left) the coverage area, for example, on a continuous or periodic basis, in response to detection of sound, or in response to a movement command received from a user via another device in communication with the device 202.

The device 202 can comprise at least one memory 204 that can store computer-executable components and instructions. The device 202 also can include at least one processor component 206 that can be communicatively coupled to the at least one memory 204. The coupling of the at least one memory 204 to the at least one processor component 206 can include various communications including, but not limited to, direct communications, indirect communications, wired communications, and/or wireless communications. The at least one processor component 206 can be operable to execute or facilitate execution of one or more of the computer-executable components stored in the at least one memory 204. In some embodiments, the at least one processor component 206 can be directly involved in the execution of the computer-executable component(s). Additionally or alternatively, the at least one processor component 206 can be indirectly involved in the execution of the computer executable component(s). For example, the at least one processor component 206 can direct one or more components to perform the operations.

It is noted that although one or more computer-executable components can be described herein and illustrated as components separate from the at least one memory 204 (e.g., operatively connected to memory), in accordance with various embodiments, the one or more computer-executable components, or portions thereof, can be stored in the at least one memory 204. Further, while various components have been illustrated as separate components, it will be appreciated that multiple components can be implemented as a single component, or a single component can be implemented as multiple components, without departing from example embodiments.

The device 202 further can comprise an image capture component 208 (e.g., a camera) that can receive or capture visual images of visual objects (e.g., people, places, and/or things) and events (e.g., sports game, concert, birthday party, or another type(s) of events) to facilitate generating video content of the visual objects and the events. The image capture component 208 can include one or more lenses (not shown in FIG. 2) that can be used to facilitate receiving or capturing the visual images of the visual objects and the events. The one or more lenses can have a field of view that can span a defined area (e.g., the defined area can define the field of view), wherein the one or more lenses can perceive and receive the visual objects and the events that are within the field of view of the one or more lenses based on a direction the image capture component 208 is facing at the time of recording the visual objects and the events. Generally, the one or more lenses are not able to perceive and receive any visual objects or events that are not within the field of view of the one or more lenses. The video content generated using the image capture component 208 can be stored in the at least one memory 204 and/or displayed on a display screen (e.g., a liquid crystal display (LCD) type of display screen, or a light emitting diode (LED) type of display screen) of a display component 210 of the device 202.

The device 202 also can include an audio capture component 212 that can receive or capture sounds made in proximity to the audio capture component 212 (e.g., made within an area surrounding the audio capture component 212) to generate audio content. The audio capture component 212 can comprise one or more microphones (e.g., one microphone, two microphones, three microphones, . . . ) or audio sensors that can receive or capture the sounds, such as sounds relating to the events, made in proximity to the audio capture component 212. The audio content can be stored in the at least one memory 204. Additionally or alternatively, the audio content can be presented to a user of the device 202 via one or more speakers (not shown) of the device 202 or via an audio interface (not shown) of the device 202 that can communicatively connect the device 202 to earbuds or an audio system via a wired or wireless communication connection.

The device 202 can comprise an analyzer component 214 that can analyze information, including the video content, the audio content, or other information, to facilitate generating analysis results that can be used to facilitate determining whether the video content received or generated by the device 202 is meaningful or significant with respect to an event being recorded by the device 202. For instance, the analyzer component 214 can analyze the audio content associated with the video content relating to the event to facilitate determining whether a defined event (e.g., gunfire, an explosion, vehicle collision, scream by a person, noise relating to a physical attack on the person) exists (e.g., is present) in the audio content. The defined event can be a key or significant event (e.g., a meaningful or relevant event), occurring during the event, that can be meaningful or relevant to the user or another person(s) or entity(ies). The defined event can be associated with (e.g., can occur at) a location (e.g., a home, a building, a venue, an open area (e.g., a field, a park, a yard, a street), or other location). The analyzer component 214 can detect or identify the defined event in the audio content, for example, by analyzing, in the audio content, the pattern of features (e.g., characteristics, or attributes), such as the STE value, the ZCR, the LPC coefficient, the MFCC, and/or other features, associated with (e.g., contained in, derived from) the audio content.

The device 202 can further include a media management component 216 that can facilitate determining whether the video content received or generated by the device 202 is meaningful or significant (e.g., whether the video content comprises the defined event) with respect to the event being recorded by the device 202. The media management component 216 also can facilitate controlling operations of other components (e.g., the at least one memory 204, the at least one processor component 206, the image capture component 208, the display component 210, the audio capture component 212, the analyzer component 214, . . . ) of the device 202 in connection with determining whether the video content received or generated by the device 202 is meaningful or significant with respect to the event being recorded by the device 202. The media management component 216 can determine whether the defined event exists in the audio content based on results of the analyzing of the audio content by the analyzer component 214. If the media management component 216 determines that the defined event does not exist in the audio content, the media management component 216 can determine that the video content is not meaningful or significant with respect to the event.

If the media management component 216 determines that the defined event exists in the audio content, the media management component 216 can determine whether the image capture component 208 captured the event-related video content related to the defined event in connection with capture of the video content based on the results of analyzing a first direction (e.g., a sound direction) in which the defined event occurred relative to the audio capture component 212 in relation to a second direction (e.g., a camera facing direction) that the image capture component 208 was facing while capturing the video content, in accordance with the defined match criteria. The media management component 216 can determine or estimate the first direction of the audio content with respect to the defined event based on the results of the analyzing of the audio content. In some embodiments, based on the results of the analyzing of the audio content, the media management component 216 can determine or estimate the first direction of the audio content with respect to the defined event by determining the TDOA between two or more audio signals relating to the defined event that were received by the audio capture component 212. For instance, a first audio signal relating to a sound(s) from the defined event can be received or sensed by a first microphone (or a first audio sensor) of the device 202 at a first time, and a second audio signal relating to the sound(s) from the defined event can be received or sensed by a second microphone (or a second audio sensor) of the device 202 at a second time. The media management component 216 or the analyzer component 214 can determine a difference in time between the first time and the second time, and can determine or know respective locations of, and positional relationships between, the first microphone (or the first audio sensor) and the second microphone (or the second audio sensor). Based on the difference in time between the first time and the second time, and the respective locations of, and the positional relationships between, the first microphone (or the first audio sensor) and the second microphone (or the second audio sensor), the media management component 216 can determine the first direction or estimate the first direction of the audio content with respect to the defined event.

Additionally or alternatively, based on the results of the analyzing of the audio content, the media management component 216 can determine or estimate the first direction of the audio content with respect to the defined event by triangulating a source of a sound associated with the defined event in the audio content based on analyzing a first portion, a second portion, and/or a third portion of the audio content. The first portion of the audio content can be received via the first microphone (or the first audio sensor), the second portion of the audio content can be received via the second microphone (or the second audio sensor), and the third portion of the audio content can be received via a third microphone (or a third audio sensor), of the audio capture component 212, respectively. In certain embodiments, the media management component 216 can triangulate the source of the sound associated with the defined event in the audio content based on three microphones (or audio sensors) and associated portions of audio content. In other embodiments, the media management component 216 can triangulate the source of the sound associated with the defined event in the audio content based on two microphones (or audio sensors) and associated portions of the audio content.

To facilitate determining or estimating the first direction of the audio content with respect to the defined event using the TDOA technique, the triangulation technique, or another audio analysis technique, the media management component 216 can know or can determine respective locations of, and positional relationships between, the first microphone (or the first audio sensor), the second microphone (or the second audio sensor), and/or the third microphone (or the third audio sensor), of the audio capture component 212. For example, an application (e.g., the media management application) associated with the device 202 can comprise information regarding the respective locations, positions, and/or orientations of the respective microphones of the device 202. The media management component 216 can know or identify the respective locations of, and the positional relationships between, the first microphone (or the first audio sensor), the second microphone (or the second audio sensor), and/or the third microphone (or the third audio sensor) based on the information regarding the respective locations, positions, and/or orientations of the respective microphones of the device 202. For instance, the media management component 216 can know or identify that a first location of the first microphone (or the first audio sensor) is at first Cartesian coordinates $(x_1, y_1, z_1)$ on the device 202, a second location of the second microphone (or the second audio sensor) is at second Cartesian coordinates $(x_2, y_2, z_2)$ on the device 202, and/or a third location of the third microphone (or the third audio sensor) is at third Cartesian coordinates $(x_3, y_3, z_3)$ on the device 202, based on the information regarding the respective locations, positions, and/or orientations of the respective microphones of the device 202.

As another example, the media management component 216 can receive the information relating to features of the device 202 from one or more external data sources (e.g., a website associated with a manufacturer of the device 202, or a website associated with a third party), or from a user of the device 202. The information relating to the features of the device 202 can comprise, for example, type, manufacturer, and/or model of the device 202, information regarding specifications, design, and/or layout of components of the device 202 (e.g., information regarding the respective locations, positions, and/or orientations of the respective microphones of the device 202), and/or information regarding type of microphones (or audio sensors) of the device 202. The media management component 216 can determine the respective locations of, and the positional relationships between, the first microphone (or the first audio sensor), the second microphone (or the second audio sensor), and/or the third microphone (or the third audio sensor) based on the information relating to the features of the device 202. For instance, the media management component 216 or the analyzer component 214 can analyze the information relating to the features of the device 202. Based on the analysis results, the media management component 216 can determine the respective locations of, and the positional relationships between, the first microphone (or the first audio sensor), the second microphone (or the second audio sensor), and/or the third microphone (or the third audio sensor), of the audio capture component 212.

The media management component 216 also can employ the analyzer component 214 to analyze the video content to generate analysis results that can be used to facilitate determining the second direction that the image capture component 208 was facing while receiving or capturing the video content. The media management component 216 can determine the second direction that the image capture component 208 was facing while receiving or capturing the video content based on such analysis results. The media management component 216 also can determine the field of view of the image capture component 208 (e.g., the field of view of the one or more lenses of the image capture component 208) with respect to the second direction of the image capture component 208 based on such analysis results. For instance, as part of the analysis of the video content, the analyzer component can analyze the video content and/or information relating to features (e.g., characteristics, specifications, or a type) of the one or more lenses of the image capture component 208 that indicate or provide information regarding the field of view of the image capture component 208. Based on such analysis results, the media management component 216 can determine the field of view of the image capture component 208 with respect to the second direction of the image capture component 208.

In some embodiments, the media management component 216 can determine the second direction that the image capture component 208 was facing and/or the field of view of the image capture component 208 while receiving or capturing the video content based on an image analysis of the video content, based on sensor information received from one or more sensors associated with the device 202, and/or based on one or more other analysis techniques. For example, employing image analysis, the analyzer component 214 can analyze one or more visual images of the video content to facilitate detecting or identifying (e.g., recognizing, determining) visual objects (e.g., landmarks, including geographic landmarks) in the one or more visual images. Based on such analysis results, the media management component 216 can identify the visual objects in the one or more visual images (e.g., based on a comparison of a visual object(s) in a visual image to a library of landmarks to identify a match of the visual object(s) to a landmark in the library). Also, based on the analysis results, the media management component 216 can determine a location (e.g., geographical location) of the device 202. Further, based on the analysis results, which can facilitate determining relative locations, and respective orientations, of the visual objects identified in the one or more visual images (e.g., by the media management component 216), the media management component 216 can determine the second direction of the image capture component 208, and the field of view of the image capture component 208.

In certain embodiments, with regard to visual images that are captured outdoors, the analyzer component 214 or the media management component 216 can detect and determine an elevation of the sun in the one or more visual images and/or respective lengths of the visual objects and associated shadows to facilitate determining the location of the image capture component 208, which can facilitate identification of the visual objects (e.g., landmarks), and determination or estimation of the second direction and the field of view of the image capture component 208. Additionally or alternatively, in other embodiments, location information (e.g., geospatial metadata, such as global positioning system (GPS) data) can be associated with (e.g., linked with or tagged to) the one or more visual images. The analyzer component 214 can analyze the location information to facilitate identifying the location of the image capture component 208. Based on the results of analyzing the location information, the media management component 216 can determine the location of the image capture component 208, which can facilitate the identification of the visual objects (e.g., landmarks) in the one or more visual images (e.g., based on known landmarks associated with known locations). The media management component 216 can determine or estimate the second direction (e.g., the camera facing direction) and the field of view of the image capture component 208 based on the identification of the visual objects in the one or more visual images (including determination of relative locations and/or respective orientations of the visual objects within the one or more visual images), and the identification or determination of the geographical location of the visual objects in the one or more visual images.

In addition to, or as an alternative to, performing image analysis on the video content to determine the second direction that the image capture component 208 is facing, the device 202 can utilize sensors to facilitate determining the second direction associated with the image capture component 208. For example, the device 202 can comprise and/or can employ one or more sensors, such as, for example, an electronic compass, an accelerometer(s) (e.g., a multi-axis (e.g., 3-axis) accelerometer), and/or a gyroscope(s) (e.g., a multi-axis (e.g., 3-axis) gyroscope), that can sense the direction the device 202 is facing (e.g., the second direction the image capture component 208 is facing), orientation of the device 202, and/or movement of the device 202. With regard to a multi-axis accelerometer, for instance, movement of the device 202 can be detected by the multi-axis accelerometer, and the multi-axis accelerometer can identify or indicate the direction in which the device 202 is moving based on the movement of the device 202, wherein the direction the device 202 is moving can be an indicator of the direction the image capture component 208 is facing and/or can facilitate identifying the direction the image capture component 208 is facing. Additionally or alternatively, the device 202 can comprise and/or can employ a GPS component or application that can detect or identify the direction of movement of the device 202. A vehicle with the device 202 integrated therein can employ the GPS component or application, for example, wherein the GPS component or application can detect or identify the direction of movement of the vehicle and correspondingly the device 202.

The analyzer component 214 can receive sensor information from the one or more sensors and/or movement information from the GPS component or application. The sensor information can identify or indicate the direction the device 202 is facing, the orientation of the device 202, and/or the movement of the device 202. The movement information from the GPS component or application can facilitate detecting or identifying the direction of movement of the device 202. The analyzer component 214 can analyze the sensor information and/or the movement information to generate analysis results that can facilitate identifying or indicating the second direction the image capture component 208 is facing. The media management component 216 can determine or identify the second direction that the image capture component 208 is facing, based on such analysis results. It is to be appreciated and understood that, additionally or alternatively, the device 202 can utilize techniques other than image analysis and sensor analysis to facilitate determining the second direction that the image capture component 208 is facing at a given time, in accordance with the disclosed subject matter.

In some embodiments, the media management component 216 can compare the first direction in which the defined event occurred relative to the audio capture component 212 to the second direction that the image capture component 208 was facing and/or the field of view of the image capture component 208 while receiving or capturing the video content to determine whether the defined event occurred within the field of view of the image capture component 208. If, based on a result of the comparing, the media management component 216 determines that the first direction is within the field of view of the image capture component 208, the media management component 216 can determine that the image capture component 208 captured the event-related video content related to the defined event, in accordance with the defined match criteria. The defined match criteria can indicate or relate to when the first direction associated with the audio content matches or substantially matches the second direction associated with the video content (e.g., can indicate when the first direction is within the field of view of the image capture component 208). If, based on the result of the comparing, the media management component 216 determines that the first direction is not within the field of view of the image capture component 208, the media management component 216 can determine that the image capture component 208 did not capture the event-related video content related to the defined event in connection with capturing the video content, in accordance with the defined match criteria. That is, the media management component 216 can determine that the second direction associated with the video content does not match or substantially match the first direction associated with the audio content.

Figure 3:
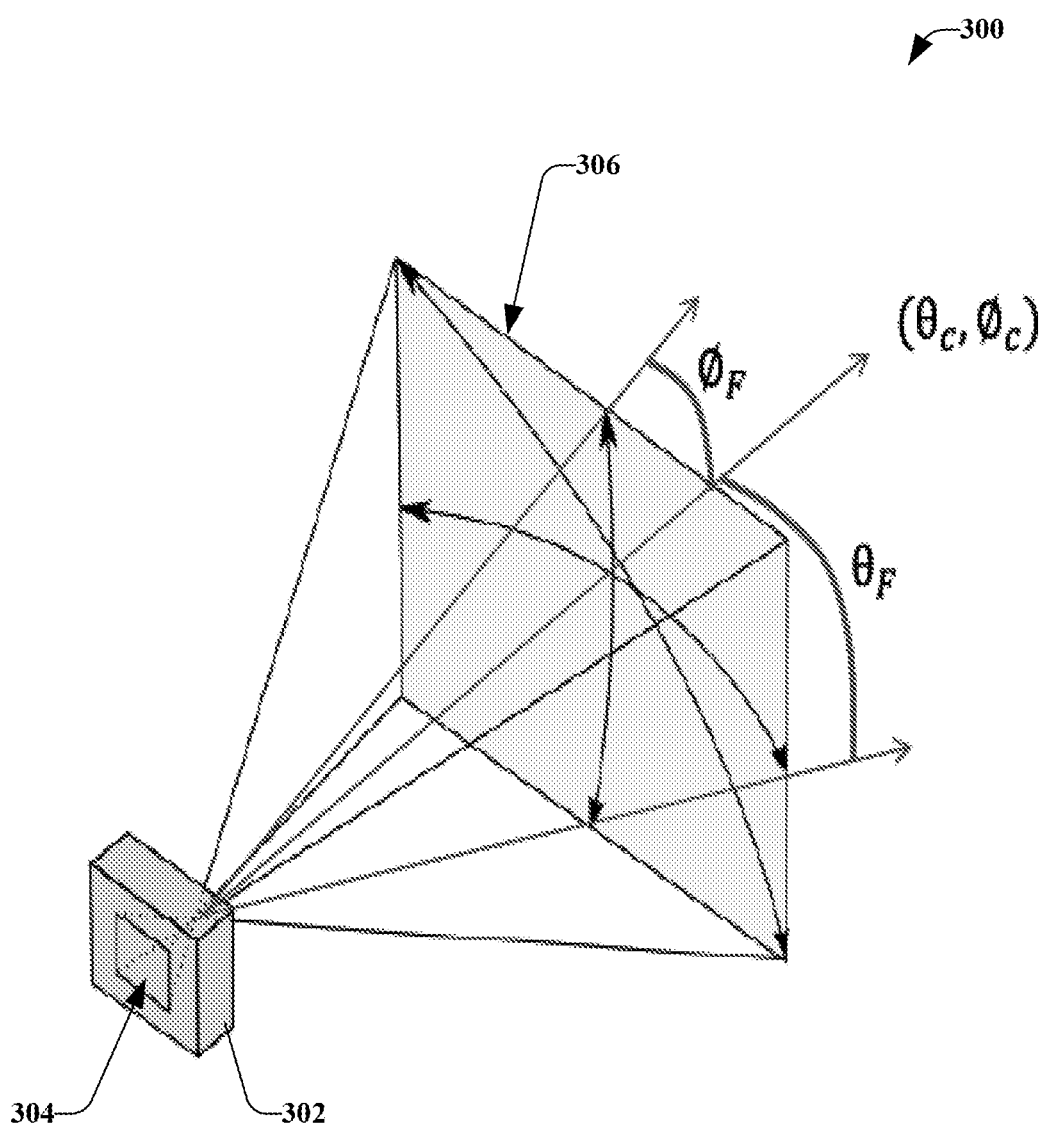
FIG. 3 illustrates a diagram of an example, non-limiting embodiment of an image capture that illustrates a field of view of an image capture component of a device, in accordance with various aspects and embodiments of the disclosed subject matter.

Referring briefly to FIG. 3 (along with FIG. 2), presented is a diagram of an example image capture 300 that illustrates a field of view of an image capture component (e.g., a camera) of a device, in accordance with various aspects and embodiments of the disclosed subject matter. As illustrated in the example image capture 300, there can be the image capture component 302 (a portion of which is illustrated in the example image capture 300) that can be employed to capture visual images of the event.

The image capture component 302 can comprise a lens 304 that can facilitate capturing the visual image of the event. The lens 304 can have a defined shape and a defined size, and can comprise or be associated with defined lens features (e.g., a length, a width, a diameter, a focal length, a zoom or magnification level, a lens angle (e.g., a wide-angle lens, a normal or standard angle lens, a telephoto lens)). The field of view 306 of the image capture component 302 can be based on the defined shape, the defined size, and/or the defined lens features of the lens 304 of the image capture component 302. Accordingly, the media management component 216 can determine the field of view 306 of the image capture component 302 based on the defined shape, the defined size, and/or the defined lens features of the lens 304 of the image capture component 302. The media management component 216 can determine the defined shape, the defined size, and/or the defined lens features of the image capture component 302 based on results of an analysis of one or more visual images captured by the image capture component 302 and/or results of an analysis of other information relating to the characteristics or the specifications relating to the lens 304 or the image capture component 302, and/or the type (e.g., a make, a model, a manufacturer) of the lens 304 of the image capture component 302. The one or more visual images can be visual images captured at or near the time of capture of the audio content that comprises the defined event, or at another desired time.

As illustrated in FIG. 3, a direction (e.g., the second direction) the image capture component 302 (e.g., the lens 304 of the image capture component 302) is facing can be, for example, ($\theta_C$, $\phi_C$). The field of view 306 of the image capture component 302 can be ($\pm\phi_F$, $\pm\phi_F$). The media management component 216 can determine or estimate the first direction of the defined event (e.g., the key or significant event) contained in the audio content (e.g., audio signal) to be ($\theta_A$, $\phi_A$). In some embodiments, the media management component 216 can determine that the second direction associated with the video content does match or substantially match the first direction associated with the audio content, if, based on the results of analyzing the video content and the audio content, the media management component 216 determines that:

$$\theta_C - \theta_F < \theta_A < \theta_C + \theta_F \qquad \text{(Equation (1)) and}$$

$$\phi_C - \phi_F < \phi_A < \phi_C + \phi_F \qquad \text{(Equation (2)).}$$

In such instance, the media management component 216 can determine that the event-related video content is contained in the video content captured by the image capture component 302.

If, however, based on the results of analyzing the video content and the audio content, the media management component 216 determines that Equation (1) and/or Equation (2) are not satisfied, the media management component 216 can determine that the second direction associated with the video content does not match or substantially match the first direction associated with the audio content. In this instance, the media management component 216 can determine that the event-related video content is not contained in the video content captured by the image capture component 302.

With further regard to FIG. 2 and the system 200, the device 202 can comprise an emphasizer component 218 that can facilitate emphasizing, highlighting, providing a notification regarding, and/or drawing attention to the video content comprising the event-related video content. In response to the media management component 216 determining that the event-related video content is contained in the video content, the emphasizer component 218 can generate and present an indicator (e.g., a match indicator) that can indicate that the video content contains the event-related video content, wherein the indicator can be presented by or in proximity to the display component 210. For example, the emphasizer component 218 and/or the display component 210 can facilitate presenting (e.g., displaying) the indicator in connection with or relation to (e.g., on or in proximity to) a display (e.g., a graphical display) of a video file comprising the video content. As another example, during display of the video content by the display component 210, the emphasizer component 218 and/or the display component 210 can facilitate presenting the indicator while the video content is being presented by the display component, or at, near, or during a particular period of time that the event-related video content is being presented by the display component 210. The indicator can facilitate notifying the user of the device 202 that the video content comprises the event-related video content and/or what portion of the video content comprises the event-related video content (e.g., the meaningful or significant video content).

Additionally or alternatively, the device 202 can employ a communicator component 220 that can transmit a message (e.g., a notification message), which can comprise the indicator or another type of indicator generated by the emphasizer component 218, to a media monitoring system 222 that can be associated with the device 202. The device 202 can be associated with (e.g., communicatively connected to) the media monitoring system 222, for example, via a wired or wireless connection. The message can notify the media monitoring system 222 and/or a monitoring user or entity associated with the media monitoring system 222 that the device 202 has the video content that comprises the event-related video content. The media monitoring system 222 can comprise, for example, a media monitoring device(s) (not shown in FIG. 2).

In some embodiments, based on the indicator presented to the user of the device 202 via the emphasizer component 218 and/or the display component 210, the user can decide whether to communicate the video content, or a portion thereof, and/or the audio content, or a portion thereof, to the media monitoring system 222. The portion of the video content can comprise the event-related video content, or additionally, another part(s) of the video content prior to or after the event-related video content (e.g., to facilitate providing context for the event-related video content). The portion of the audio content can comprise the event-related audio content, or additionally, another part(s) of the audio content prior to or after the event-related audio content (e.g., to facilitate providing context for the event-related audio content and/or the event-related video content).

Additionally or alternatively, the media management component 216 of the device 202 can determine whether to communicate the video content, or the portion thereof, and/or the audio content, or the portion thereof, to the media monitoring system 222 based on a user preference associated with the user and/or a preference of the media monitoring system 222, which can be communicated to the device 202 by the media monitoring system 222. The user can select or set the user preference and/or the media monitoring system 222 or the monitoring user or entity can select or set the preference associated with the media monitoring system 222. The user preference or the preference associated with the media monitoring system 222 can indicate or specify whether or not the video content comprising the event-related video content and/or the audio content is to be communicated (e.g., automatically communicated) by the device 202 to the media monitoring system 222.

If, in accordance with a decision of the user, the user preference, or the preference, the video content, or the portion thereof, and/or the audio content, or the portion thereof, is to be communicated to the media monitoring system 222, the communicator component 220 can communicate the video content, or the portion thereof, and/or the audio content, or the portion thereof, to the media monitoring system 222. As more fully described herein, the media monitoring system 222 and/or a monitoring user or entity associated with the media monitoring system 222 can perform analysis or review, and/or can take other action(s) with regard to the video content, or the portion thereof, and/or the audio content, or the portion thereof, received by the media monitoring system 222.

With further regard to the indicator, the indicator can be or can comprise a visual indicator displayed in a portion of a visual image of the video content displayed by the display component 210, or an LED or other type of visual indicator presented in proximity to the display of the video content by the display component 210. Additionally or alternatively, the indicator can be or can comprise an audio indicator (e.g., a sound or an alarm) presented by the device 202, and/or another type of visual, audio, and/or sensory indicator (e.g., a vibration of the device 202).

The message (e.g., the notification message), which can comprise the indicator or the other type of indicator generated by the emphasizer component 218, can comprise information relating to the indicator or the other type of indicator. This information can facilitate generating and presenting (e.g., by the media monitoring system 222) the visual indicator, the audio indicator, and/or the other type of visual, audio, and/or sensory indicator by or in proximity to a display component (not shown in FIG. 2) of the media monitoring system 222.

In some embodiments, the media management component 216 can take into consideration the first direction of the audio content associated with the audio capture component 212 and the second direction of the video content associated with the image capture component 208 during a defined period of time prior to the defined event occurring, based on the defined match criteria, to facilitate determining whether the event-related video content is contained in the video content. For instance, depending on a type of the defined event (e.g., gunfire, explosion, vehicle collision, scream by a person, noise relating to a physical attack on the person, or other type of event), certain video content that can be captured (e.g., recorded) prior to the defined event can be meaningful and/or significant (e.g., more meaningful and/or significant than other video content captured after the defined event). In some situations, during a particular event (e.g., the explosion), for example, many people may look and/or turn their devices, comprising image capture components (e.g., cameras), in a direction of the defined event, in response to the occurrence of the defined event, even though their image capture components were not facing the direction of the time event at a time of or prior to the time of the defined event. However, depending on a given situation, the certain video content that can be captured by such devices prior to the defined event can be relatively more meaningful and/or significant than other video content captured thereafter (e.g., after occurrence of the defined event).

In certain embodiments, to facilitate determining or identifying what is to be considered the event-related video content, the media management component 216 can take into account an amount of time that the second direction and/or the field of view associated with the image capture component 208 was aligned or substantially aligned with the first direction associated with the audio content prior to a time that the defined event was determined to occur. For instance, the media management component 216 can determine the amount (e.g., a length) of time that the second direction or the field of view associated with the image capture component 208 was aligned or substantially aligned with the first direction associated with the audio content prior to a time that the defined event occurred with respect to the audio content. The media management component 216 can determine whether the amount of time that the second direction and/or the field of view associated with the image capture component 208 was aligned or substantially aligned with the first direction associated with the audio content satisfies (e.g., meets or exceeds) a defined threshold amount of time relating to a meaningfulness or significance of the video content.

The defined threshold amount of time determined and/or applied by the media management component 216 can vary (e.g., can be different, or can be adjusted) based on the type of defined event. For example, for a first type of defined event (e.g., a particular type of explosion), the media management component 216 can apply a first defined threshold amount of time, and, for a second type of event (e.g., the vehicle collision), the media management component 216 can apply a second defined threshold amount of time, in accordance with the defined match criteria. For instance, it can be determined (e.g., by the media management component 216 or another component) that it is appropriate for the first threshold amount of time to be two minutes (or one minute, or another desired amount of time determined to be appropriate) based on the first type of defined event being the particular type of explosion. It also can be determined (e.g., by the media management component 216 or another component) that it is appropriate for the second threshold amount of time to be ten seconds (or fifteen seconds, or another desired amount of time determined to be appropriate) based on the second type of defined event being the vehicle collision.

In response to determining that the amount of time that the second direction and/or the field of view of the image capture component 208 was aligned or substantially aligned with the first direction associated with the audio content satisfies the defined threshold amount of time, the media management component 216 can determine that the event-related video content was captured by the image capture component 208, in accordance with the defined match criteria. In response to determining that the second direction and/or the field of view of the image capture component 208 was aligned or substantially aligned with the first direction associated with the audio content does not satisfy (e.g., does not meet or exceed) the defined threshold amount of time, the media management component 216 can determine that the event-related video content was not captured by the image capture component 208, in accordance with the defined match criteria.

In determining whether the video content satisfies the defined threshold amount of time, it can be taken into account that a user of the device 202 may be moving the image capture component 208 or scanning with the image capture component 208 while capturing the video content. Consequently, there may be instances where the image capture component 208 can be facing in the second direction, or substantially in the second direction, that is aligned or substantially aligned with the first direction associated with the audio content for a substantial amount of time, but not the entire time of the defined threshold amount of time, prior to the defined event and/or may not be aligned or substantially aligned with the first direction associated with the audio content at the time of the defined event. In certain embodiments, the media management component 216 can determine whether the second direction and/or the field of view of the image capture component 208 was aligned or substantially aligned with the first direction associated with the audio content for a defined threshold percentage of the defined threshold amount of time prior to the time of the defined event. The defined threshold percentage can be a desired percentage, which can be determined (e.g., by the media management component 216) based on the type of defined event or other factors, in accordance with the defined match criteria. For example, the defined threshold percentage can be 75%, 80%, 90%, or other desired percentage.

If the media management component 216 determines that the second direction and/or the field of view of the image capture component 208 was aligned or substantially aligned with the first direction associated with the audio content for the defined threshold percentage of the defined threshold amount of time prior to the time of the defined event, the media management component 216 can determine that the video content satisfies the defined threshold percentage of the defined threshold amount of time (e.g., an alternate defined threshold amount of time). Accordingly, the media management component 216 can determine that the video content comprises the event-related video content relating to the defined event. If the media management component 216 determines that the second direction and/or the field of view of the image capture component 208 was not aligned or substantially aligned with the first direction associated with the audio content for the defined threshold percentage of the defined threshold amount of time prior to the time of the defined event, the media management component 216 can determine that the video content does not satisfy the defined threshold percentage of the defined threshold amount of time. Accordingly, the media management component 216 can determine that the video content does not comprise the event-related video content relating to the defined event.

In some embodiments, the media management component 216 can employ the emphasizer component 218 to have the emphasizer component 218 generate different types of indicators to indicate different levels of meaningfulness, significance, or relevance of the video content based on whether the video content satisfies the defined threshold amount of time (or not) or whether the video content satisfies the alternate defined threshold amount of time (or not). For example, the emphasizer component 218 can generate a first relevance indicator (e.g., a green colored indicator, a "1" level indicator, an "A" level indicator, or other desired indicator) that can indicate the video content is highly relevant based on the video content satisfying the defined threshold amount of time. The emphasizer component 218 can generate a second relevance indicator (e.g., a yellow colored indicator, a "2" level indicator, a "B" level indicator, or other desired indicator) that can indicate the video content has a medium level of relevancy based on the video content satisfying the defined threshold percentage of the defined threshold amount of time, but not satisfying the defined threshold amount of time. The emphasizer component 218 also can generate a third relevance indicator (e.g., a red colored indicator, a "3" level indicator, a "C" level indicator, or other desired indicator) that can indicate the video content has a low level of relevancy (or no relevancy) based on the video content not satisfying the defined threshold amount of time and not satisfying the defined threshold percentage of the defined threshold amount of time. The media management component 216 or the emphasizer component 218 can associate the appropriate relevancy indicator (e.g., the first relevancy indicator, the second relevance indicator, or the third relevance indicator) with the video content, wherein the appropriate relevancy indicator can be presented with or in connection with the video content (e.g., by the display component 210, and/or in connection with communicating the video content to the media monitoring system). It is to be appreciated and understood that the types of relevancy indicators and the number of different types of relevancy indicators disclosed herein are non-limiting examples of relevancy indicators. In accordance with the disclosed subject matter, there can be other types of relevancy indicators and/or a different number of different types of relevancy indicators from those disclosed supra.

Relatively frequently, when the user is capturing the video content and the audio content using the device 202, the user or other people near the user may be talking or making other sounds. The user and/or the other people may be relatively close to the one or more microphones of the audio capture component 212. As a result, the voice(s) of the user and/or the other people may be relatively loud as compared to the loudness level of other sounds (e.g., sounds from the defined event). This potentially can disturb or interfere with detection of the defined event by the media management component 216, as such extraneous sounds potentially can interfere with or make more difficult the determination of the first direction of the sound of the defined event.

The media management component 216 and/or the analyzer component 214 can account for such extraneous sounds. The audio signals can be captured as is by the audio capture component 212 to generate the audio content. To account for the extraneous sounds (e.g., user talking while capturing the audio content and the video content), in certain embodiments, during the analysis of the audio content, the media management component 216 and/or the analyzer component 214 can disregard or filter out, in or from the audio content, the extraneous sounds (e.g., sounds in an opposite or substantially direction of the second direction of the image capture component 208). Such extraneous sounds can be or can comprise, for example, the sounds of the user and/or the other people nearby who is or are talking during capture of the audio content and/or the video content. For instance, the media management component 216 and/or the analyzer component 214 can determine what sounds are in a direction that is opposite or substantially opposite to the second direction of the image capture component 208, and can ignore, disregard, or filter out (e.g., using a desired audio filter) those sounds that are in the direction that is opposite or substantially opposite to the second direction of the image capture component 208.

Figure 4:
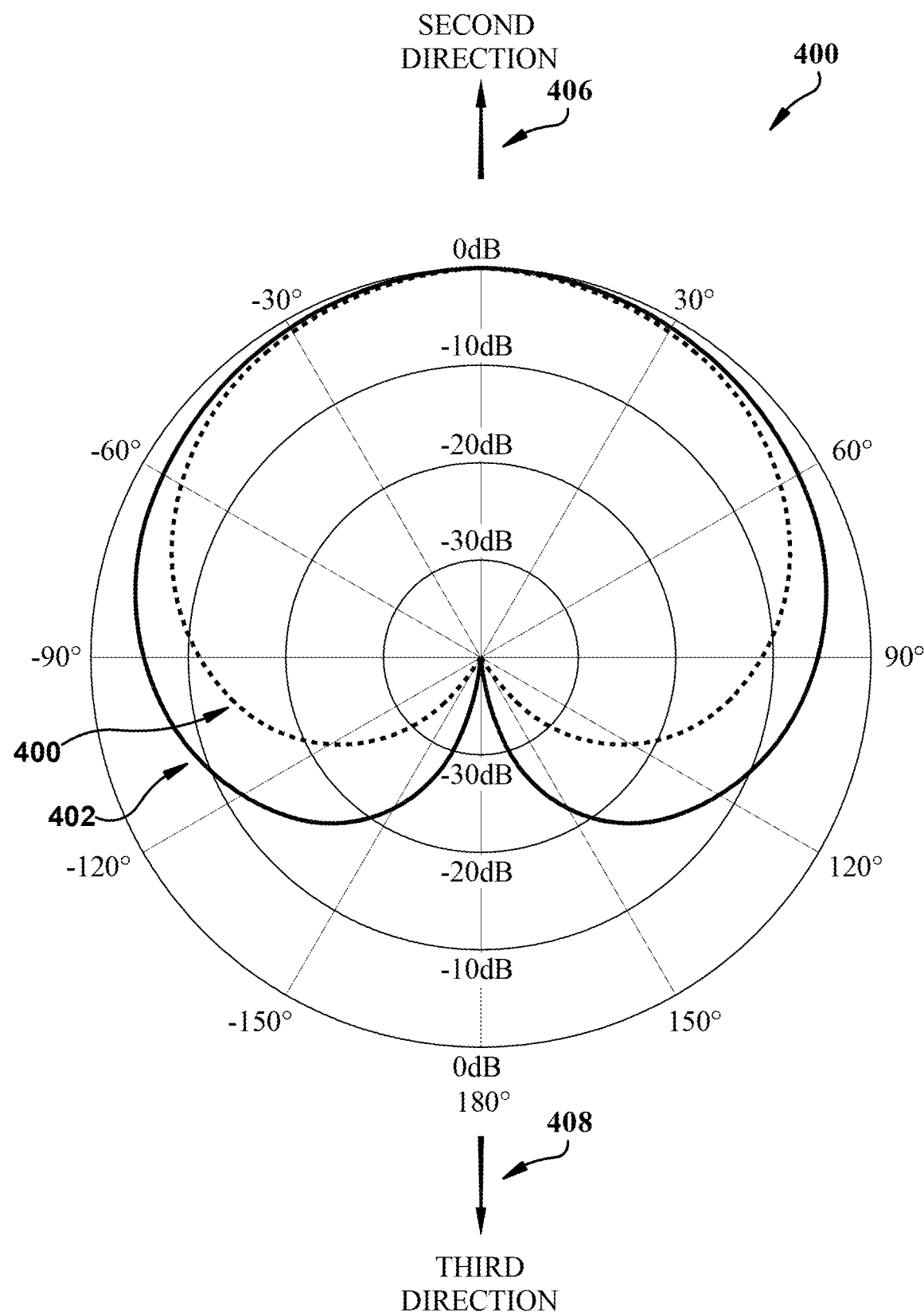
FIG. 4 illustrates a diagram of an example, non-limiting embodiment of a beam pattern of a microphone array comprising a desired number of microphones of a device that can be employed to facilitate determining what sounds in the audio content are to be considered in connection with determining whether the defined event exists in the audio content and/or the first direction of the defined event in the audio content, in accordance with various aspects and embodiments of the disclosed subject matter.

In certain embodiments, the media management component 216 and/or the analyzer component 214 can determine and/or set a beam pattern of a microphone array, comprising the microphones of the audio capture component 212, to facilitate removing or masking out the extraneous sounds from the audio content to facilitate analyzing the audio content to determine whether the defined event exists in the audio content and/or the first direction of the defined event in the audio content. For instance, referring briefly to FIG. 4 (along with FIG. 2), depicted is a diagram of an example beam pattern 400 of a microphone array comprising a desired number of microphones of a device (e.g., the device 202) that can be employed to facilitate determining what sounds in the audio content are to be considered in connection with determining whether the defined event exists in the audio content and/or the first direction of the defined event in the audio content, in accordance with various aspects and embodiments of the disclosed subject matter. As can be observed in the beam pattern 400, with regard to a first beam pattern 402 or a second beam pattern 404, sounds that are in the second direction 406, or are substantially in the second direction 406, of the image capture component 208 can remain for analysis by the analyzer component 214 and/or the media management component 216. However, other sounds that are opposite or substantially opposite to the second direction 406, such as sounds in a third direction 408, can be removed, masked out, or disregarded based on the first beam pattern 402 or the second beam pattern 404.

Figure 5:
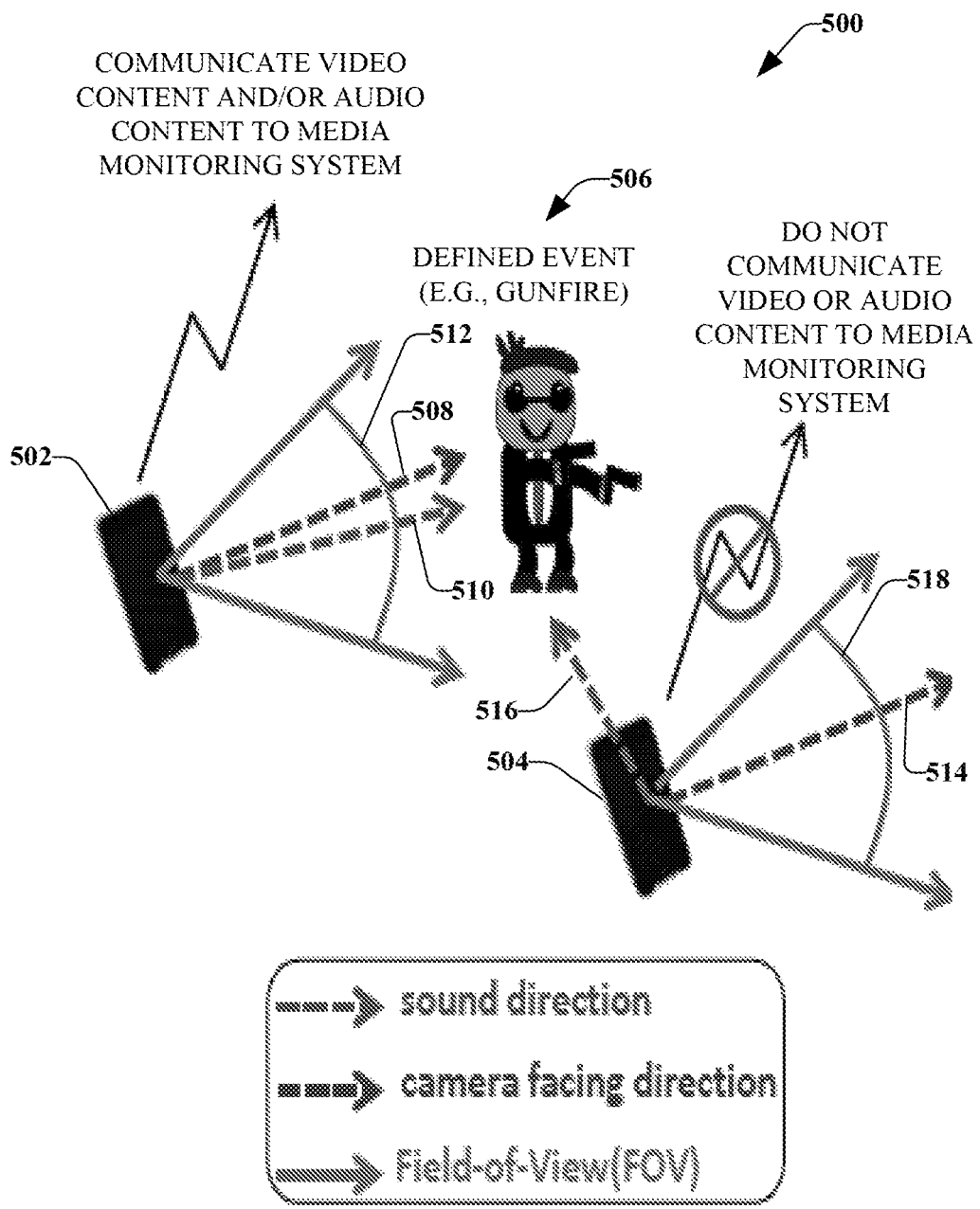
FIG. 5 depicts an example, non-limiting embodiment of an illustrative presentation that can illustrate management of videos associated with events, in accordance with various aspects and embodiments of the disclosed subject matter.

FIG. 5 depicts an example, non-limiting embodiment of an illustrative presentation 500 that can illustrate management of videos associated with events (e.g., by the system 200), in accordance with various aspects and embodiments of the disclosed subject matter. The illustrative presentation 500 can comprise a first device 502 and a second device 504 that can be located in an area where a defined event 506 (e.g., a key event), such as, for example, gunfire, occurs, at a particular location in the area. The first device 502 and the second device 504, respectively, can be or can comprise, for example, a mobile phone, a computer, an electronic tablet, a video camera, or video recording equipment integrated with a vehicle. The first device 502 and the second device 504, respectively, can be a mobile device or a stationary device.

The first device 502 can capture first video content and first audio content while operating in the area. While capturing the first video content and the first audio content, a first image capture component (not shown in FIG. 5; and can be same as or similar to the image capture component 208) of the first device 502 can be facing in a first image capture direction 508 (e.g., a first camera facing direction). Also, a first audio capture component (not shown in FIG. 5; and can be same as or similar to the audio capture component 212) of the first device 502 can be capturing the first audio content, including first event-related audio content relating to the defined event 506, in a first sound direction 510 with respect to the defined event 506. The first image capture component of the first device 502 can have a first field of view 512, wherein first visual objects that are within the first field of view 512 can be captured by the first image capture component. The first field of view 512 can be based on (e.g., can be determined based on) a set of first characteristics (e.g., a type of image capture component, a type(s) of camera lens being employed, a number of camera lenses being employed, a feature(s) (e.g., digital or analog zoom features, digital or analog visual effects) being employed) associated with the first image capture component.

The second device 504 can capture second video content and second audio content while operating in the area. In connection with capturing the second video content and the second audio content, a second image capture component (not shown in FIG. 5; and can be same as or similar to the image capture component 208) of the second device 504 can be facing in a second image capture direction 514 (e.g., a second camera facing direction). Also, a second audio capture component (not shown in FIG. 5; and can be same as or similar to the audio capture component 212) of the second device 504 can be capturing the second audio content, including second event-related audio content relating to the defined event 506, in a second sound direction 516 with respect to the defined event 506. The second image capture component of the second device 502 can have a second field of view 518, wherein second visual objects that are within the second field of view 518 can be captured by the second image capture component. The second field of view 518 can be based on (e.g., can be determined based on) a set of second characteristics associated with the second image capture component.

With further regard to the first device 502, the first device 502 also can comprise a first analyzer component (not shown in FIG. 5; and can be same as or similar to the analyzer component 214) and a first media management component (not shown in FIG. 5; and can be same as or similar to the media management component 216). The first analyzer component can analyze the first audio content to generate first audio analysis results, and, based on the first audio analysis results, the first media management component can determine that the first event-related audio content related to the defined event 506 exists in the first audio content and can determine the first sound direction 510 of the first audio content in relation to the defined event 506, using one or more techniques, as more fully described herein.

In response to a determination that the first event-related audio content exists in the first audio content, the first analyzer component can analyze the first video content to generate first video analysis results. Based on the first video analysis results, the first media management component can determine the first image capture direction 508 associated with the first video content and the first field of view 512 of the first image capture component, using one or more techniques, as more fully described herein.

The first media management component of the first device 502 can determine whether the first sound direction 510 associated with the first event-related audio content is within the first field of view 512 of the first image capture component, based on an evaluation (e.g., a comparison) of the first sound direction 510 and the first field of view 512, as more fully described herein. In the example case of the first device 502, as depicted in FIG. 5, the first sound direction 510 is depicted as being within the first field of view 512. Based on the results of the evaluation of the first sound direction 510 and the first field of view 512, the first media management component can determine that the first sound direction 510 is within the first field of view 512. Accordingly, the first media management component can determine that the first video content contains first event-related video content related to the defined event 506. In response to determining that the first video content contains the first event-related video content related to the defined event 506, the first media management component of the first device 502 can communicate the first video content, or at least a portion thereof, comprising the first event-related video content and/or the first audio content, or at least a portion thereof, comprising the first event-related audio content to a media monitoring system.

With further regard to the second device 504, the second device 504 can comprise a second analyzer component (not shown in FIG. 5; and can be same as or similar to the analyzer component 214) and a second media management component (not shown in FIG. 5; and can be same as or similar to the media management component 216). The second analyzer component can analyze the second audio content to generate second audio analysis results. Based on the second audio analysis results, the second media management component can determine that the second event-related audio content related to the defined event 506 exists in the second audio content and can determine the second sound direction 516 of the second audio content in relation to the defined event 506, using one or more techniques, as more fully described herein.

In response to a determination that the second event-related audio content exists in the second audio content, the second analyzer component can analyze the second video content to generate second video analysis results. Based on the second video analysis results, the second media management component can determine the second image capture direction 514 of the first video content and the second field of view 518 of the second image capture component, using one or more techniques, as more fully described herein.

The second media management component of the second device 504 can determine whether the second sound direction 516 associated with the second event-related audio content is within the second field of view 518 of the second image capture component, based on an evaluation (e.g., a comparison) of the second sound direction 516 and the second field of view 518, as more fully described herein. In the example case of the second device 504, as depicted in FIG. 5, the second sound direction 516 is depicted as not being within the second field of view 518. Based on the results of the evaluation of the second sound direction 516 and the second field of view 518, the second media management component can determine that the second sound direction 516 is not within the second field of view 518. Accordingly, the second media management component can determine that the second video content does not contain second event-related video content related to the defined event 506. In response to determining that the second video content does not contain the second event-related video content related to the defined event 506, the second media management component of the second device 504 can determine that the second video content and the second audio content is not to be communicated to the media monitoring system.

Figure 6:
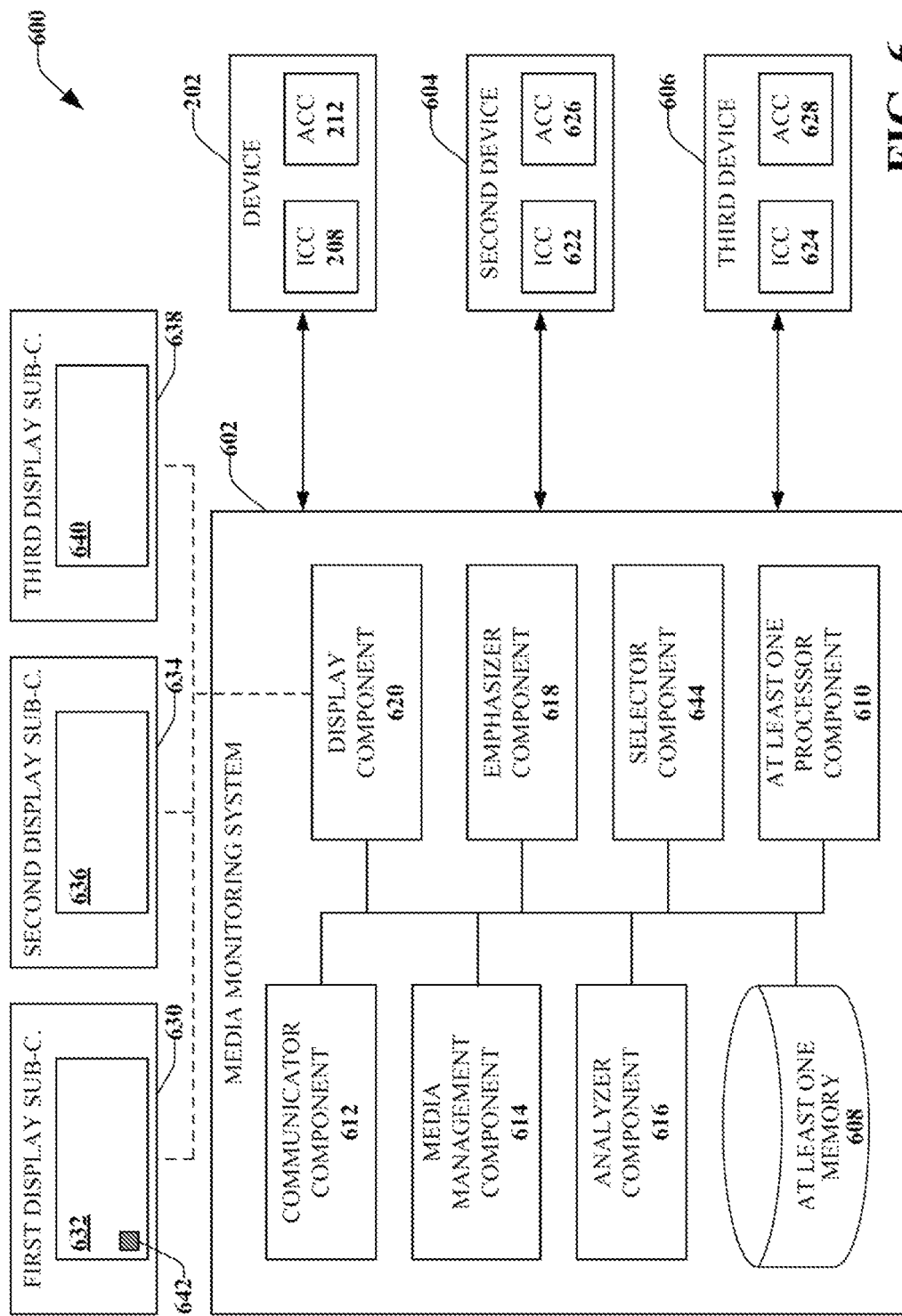
FIG. 6 illustrates an example, non-limiting embodiment of a system that can manage videos associated with events, in accordance with various aspects and embodiments of the disclosed subject matter.

Turning to FIG. 6, illustrated is an example, non-limiting embodiment of a system 600 that can manage videos associated with events, in accordance with various aspects and embodiments of the disclosed subject matter. In some embodiments, the system 600 can be associated with one or more applications, such as but not limited to, a media management application, a multimedia application, a user interface application, a controller application, a user input application, a data collection application, an authentication application, a security application, or another type of application.

The system 600 can comprise a media monitoring system 602 that can manage the videos associated with the events. At various times, the media monitoring system 602 can be associated with (e.g., communicatively connected to) a set of devices, comprising, for example, the device 202, a second device 604, and/or a third device 606. The second device 604 and/or the third device 606 can comprise the same or similar features and functions (e.g., the second device 604 and/or the third device 606 can comprise respective audio capture components, image capture components, media management components, and/or other components) as the device 202. It is to be appreciated and understood that the system 600 can comprise a desired number of devices that can be three devices (as depicted), or more or less than three devices.

In accordance with various embodiments, the media monitoring system 602 can comprise at least one memory 608, at least one processor component 610, a communicator component 612, a media management component 614, an analyzer component 616, an emphasizer component 618, and a display component 620. The at least one memory 608 can comprise the same or similar features and functions as the at least one memory 204 of the device 202. The at least one processor component 610 can comprise the same or similar features and functions as the at least one processor component 206 of the device 202. The communicator component 612 can comprise the same or similar features and functions as the communicator component 220 of the device 202. The media management component 614 can comprise the same or similar features and functions as the media management component 216 of the device 202. The analyzer component 616 can comprise the same or similar features and functions as the analyzer component 214 of the device 202. The emphasizer component 618 can comprise the same or similar features and functions as the emphasizer component 218 of the device 202. The display component 620 can comprise the same or similar features and functions as the display component 210 of the device 202.

The at least one memory 608 can store computer-executable components and instructions. The at least one processor component 610 can be communicatively coupled to the at least one memory 608. The coupling of the at least one memory 608 to the at least one processor component 610 can include various communications including, but not limited to, direct communications, indirect communications, wired communications, and/or wireless communications. The at least one processor component 610 can be operable to execute or facilitate execution of one or more of the computer-executable components stored in the at least one memory 608. In some embodiments, the at least one processor component 610 can be directly involved in the execution of the computer-executable component(s). Additionally or alternatively, the at least one processor component 610 can be indirectly involved in the execution of the computer executable component(s). For example, the at least one processor component 610 can direct one or more components to perform the operations.

It is noted that although one or more computer-executable components can be described herein and illustrated as components separate from the at least one memory 608 (e.g., operatively connected to memory), in accordance with various embodiments, the one or more computer-executable components, or portions thereof, can be stored in the at least one memory 608. Further, while various components have been illustrated as separate components, it will be appreciated that multiple components can be implemented as a single component, or a single component can be implemented as multiple components, without departing from example embodiments.

At various times, the media monitoring system 602, via the communicator component 612, can receive respective video content, audio content, and/or other information (e.g., indicators) from the device 202, the second device 604, and/or the third device 606. The media management component 614 can evaluate the respective video content, the respective audio content, and/or the other information to facilitate determining whether there is any event-related video content associated with a defined event in the respective video content, in accordance with the defined match criteria.

In various instances, some of the respective video content and audio content may have been evaluated by a respective media management component (e.g., the media management component 216) of a respective device (e.g., the device 202) to determine whether the respective video content contains any event-related video content associated with the defined event. In other various instances, other of the respective video content and audio content may not have been evaluated by another respective media management component of another respective device (e.g., the device 604) to determine whether the other respective video content contains any event-related video content associated with the defined event.

With regard to at least some of the respective video content and audio content that was evaluated by the respective media management component (e.g., the media management component 216) of the respective device (e.g., the device 202), the media management component 614 can perform an independent evaluation of such respective video content and/or audio content. The independent evaluation can be performed by the media management component 614 to determine whether the respective video content contains any event-related video content associated with the defined event. In some instances, the media management component 614 can rely on a determination made by the respective media management component of the respective device and/or a respective indicator(s) provided (e.g., presented, communicated) to the media monitoring system 600 by the respective device to facilitate determining whether the respective video content contains any event-related video content associated with the defined event. With regard to the other respective video content and/or audio content that was not evaluated by the other respective media management component(s) of the other respective device(s) (e.g., the device 604), the media management component 614 can evaluate such other respective video content and/or audio content to determine whether the other respective video content contained any event-related video content associated with the defined event.

In some embodiments, the communicator component 612 can receive the video content (e.g., first video content) and the audio content (e.g., first audio content) from the device 202, second video content and second audio content from the second device 604, and/or third video content and third audio content from the third device 606, via a wired or wireless communication connection. The first video content and the first audio content, the second video content and the second audio content, and/or the third video content and the third audio content can relate to the event. The event, which can (or may not) comprise the defined event, can be associated with (e.g., can occur at) a location (e.g., a home, a building, a venue, an open area, or other location).

The analyzer component 616 can analyze information, including the first video content, the first audio content, the second video content, the second audio content, the third video content, the third audio content, and/or other information, to facilitate generating analysis results. The analysis results can be used to facilitate determining whether the first video content, the second video content, and/or the third video content is or are meaningful or significant (e.g., contains the event-related video content) with respect to the event that was captured (e.g., recorded) by the device 202, the second device 604, and/or the third device 606, respectively.

For instance, the analyzer component 616 can analyze the first audio content associated with the first video content, the second audio content associated with the second video content, and the third audio content associated with the third video content, relating to the event to facilitate determining whether the defined event exists (e.g., is present) in the first audio content, the second audio content, and/or the third audio content. In certain embodiments, the analyzer component 616 can detect or identify the defined event in the first audio content, the second audio content, and/or the third audio content, for example, by analyzing, in the first audio content, the second audio content, and/or the third audio content, respective patterns of features (e.g., characteristics, or attributes) that can be respectively associated with (e.g., contained in, derived from) the first audio content, the second audio content, and/or the third audio content. The respective patterns of features can comprise or relate to, for example, respective STE values, respective ZCRs, respective LPC coefficients, respective MFCCs, and/or other respective features associated with (e.g., identified in) the first audio content, the second audio content, and/or the third audio content, as determined by the analyzer component 616 and/or the media management component 614.

The media management component 614 can determine whether the defined event exists in the first audio content, the second audio content, and/or the third audio content based on results of the analyzing of the first audio content, the second audio content, or the third audio content. If the media management component 614 determines that the defined event does not exist in particular audio content (e.g., the first audio content, the second audio content, or the third audio content), the media management component 614 can determine that associated particular video content (e.g., the first video content, the second video content, or the third video content) is not meaningful, significant, or relevant with respect to the event.

If the media management component 614 determines that the defined event exists in the particular audio content (e.g., the first audio content, the second audio content, or the third audio content) based on the results of the analyzing of the particular audio content under consideration, the media management component 614 can determine whether any event-related video content was captured by a particular image capture component. The particular image capture component can be the image capture component 208 (ICC 208) of the device 202 with respect to the first audio content and the first video content, a second image capture component 622 (ICC 622) of the second device 604 with respect to the second audio content and the second video content, or a third image capture component 624 (ICC 624) of the third device 606 with respect to the third audio content and the third video content. The media management component 614 can determine whether the particular image capture component captured the event-related video content related to the defined event in connection with capture of the particular video content (e.g., the first video content, the second video content, or the third video content) based on the results of analyzing a particular first direction associated with a particular audio capture component in relation to a particular second direction associated with the particular image capture component, in accordance with the defined match criteria. The particular audio capture component can be, for example, the audio capture component 212 (ACC 212) of the device 202 with respect to the first audio content, a second audio capture component 626 (ACC 626) of the second device 604 with respect to the second audio content, or a third audio capture component 628 (ACC 628) of the third device 606 with respect to the third audio content. The particular first direction associated with the particular audio capture component can be the direction in which the defined event occurred relative to the particular audio capture component. The particular second direction associated with the particular image capture component can be the direction that the particular image capture component was facing while capturing the particular video content.

The media management component 614 can determine or estimate the particular first direction associated with the particular audio content with respect to the defined event, based on the results of the analyzing of the particular audio content, using one or more audio analysis techniques. For instance, the media management component 614 can determine or estimate the particular first direction of the audio content with respect to the defined event by using one or more audio analysis techniques, such as the TDOA and/or the triangulation of sound, as more fully described herein.

The media management component 614 and/or the analyzer component 616 also can identify and account for extraneous sounds (e.g., user talking while capturing the audio content and the video content) in the particular audio content (e.g., the first audio content, the second audio content, or the third audio content). For instance, during the analysis of the audio content, the media management component 614 and/or the analyzer component 616 can determine, and can ignore, disregard, and/or filter out, in or from the particular audio content, the extraneous sounds (e.g., sounds in an opposite or substantially opposite direction of the particular second direction of the particular image capture component). Disregarding or removing the extraneous sounds in the particular audio content can be performed to facilitate determining whether the defined event exists in the particular audio content and/or to facilitate determining the particular first direction associated with the particular audio capture component (e.g., the audio capture component 212, the second audio capture component 626, or the third audio capture component 628). In some embodiments, the media management component 614 and/or the analyzer component 616 can determine and/or set a beam pattern of a particular microphone array, comprising the microphones of the particular audio capture component, to facilitate removing, disregarding, or masking out the extraneous sounds from the particular audio content, as more fully described herein.

The media management component 614 also can employ the analyzer component 616 to analyze the particular video content (e.g., the first video content, the second video content, or the third video content) to generate analysis results. Based on such analysis results, the media management component 614 can determine the particular second direction that the particular image capture component (e.g., the image capture component 208, the second image capture component 622, or the third image capture component 624) was facing while receiving or capturing the particular video content. The media management component 614 also can determine a particular field of view of the particular image capture component based on the analysis results, the particular second direction of the particular image capture component, and/or respective features of the one or more lenses of the particular image capture component (e.g., the image capture component 208, the second image capture component 622, or the third image capture component 624). The features, and/or information relating to the features, of the one or more lenses of the particular image component (e.g., as identified by the media management component 614) can indicate and/or facilitate determination of the particular field of view of the particular image capture component.

In some embodiments, the media management component 614 can compare the particular first direction associated with the particular audio capture component (e.g., the audio capture component 212, the second audio capture component 626, or the third audio capture component 628) to the particular second direction associated with the particular image capture component (e.g., the image capture component 208, the second image capture component 622, or the third image capture component 624) to generate a comparison result. If, based on the comparison result, the media management component 614 determines that the particular first direction is aligned or substantially aligned with the particular field of view (e.g., is within the particular field of view) of the particular image capture component, the media management component 614 can determine that the particular image capture component captured the event-related video content related to the defined event in connection with capturing the particular video content, in accordance with the defined match criteria. If, however, based on the comparison result, the media management component 614 determines that the particular first direction is not aligned or substantially aligned with the particular field of view (e.g., is not within the particular field of view) of the particular image capture component, the media management component 614 can determine that that the particular image capture component did not capture the event-related video content related to the defined event in connection with capturing the particular video content, in accordance with the defined match criteria.

In connection with determining whether the particular video content (e.g., the first video content, the second video content, or the third video content) contains the event-related video content, as desired (e.g., when in accordance with the defined match criteria), the media management component 614 and/or the analyzer component 616 can apply (or not apply) the defined threshold amount of time, or the defined threshold percentage of the defined threshold amount of time, with respect to the time prior to the defined event. For instance, the media management component 614 and/or the analyzer component 616 can determine whether the particular video content contains the event-related video content based on the particular first direction associated with the particular audio capture component, the particular second direction or the particular field of view of the particular image capture component, and application of the defined threshold amount of time or the defined threshold percentage of the defined threshold amount of time, as more fully described herein.

In some embodiments, the media management component 614 can determine whether the particular video content (e.g., the first video content) received from one device (e.g., the device 202) contains the event-related video content based on certain audio content (e.g., the second audio content) received from another device (e.g., the second device 604). In some instances, the particular video content can be captured by the one device (e.g., the device 202), where, for one or more reasons, such device does not capture or does not adequately capture audio content associated with the particular video content. As some examples, the device 202 may not capture audio content associated with the particular video content because the device 202 is not equipped with a microphone or other audio sensor, is not equipped with a sufficient number of microphones or other audio sensors (e.g., more than one microphone or audio sensor) to enable determining the first direction of audio content in relation to the defined event, the microphone or other audio sensor is or are not working properly, and/or the microphone or other audio sensor has been obstructed (e.g., by a user) thereby impeding or preventing capture of audio signals relating to the defined event.

The first video content captured by the device 202 can be associated with first time information (e.g., time coding, time stamping) that can indicate respective times (e.g., date, hour, minute, second) that respective portions of the first video content was captured by the device 202. The second audio content captured by the second device 604 can be associated with second time information that can indicate respective times that respective portions of the second audio content was captured by the second device 604.

The media management component 614 can determine that audio information relating to the defined event exists in the second audio content, the first direction associated with the second audio content that can indicate the direction from which the sounds of the defined event were captured by the second device 604, and a particular time that the defined event occurred in the second audio content, based on analysis results of the analysis of the second audio content and the second time information by the analyzer component 616. The media management component 614 also can determine that the video content captured by the device 202 potentially may contain the event-related video content based on results of a preliminary or initial analysis of the video content (e.g., image analysis of the video content, sensor information obtained from the device 202 that can indicate a location or direction of movement of the device 202), by the analyzer component 616, that indicates the device 202 (and associated image capture component 208) captured the video content in a location where the defined event occurred. However, since no audio content or insufficient audio content was available from the device 202, the media management component 614 is not able to determine whether the video content associated with the device 202 contains the event-related video content based on the video content alone, or based on the video content and the insufficient audio content.

The analyzer component 616 can analyze a particular part of the video content that was captured at or near the particular time that the defined event occurred. The analyzer component 616 or the media management component 614 can determine the particular part of the video content to be analyzed by the analyzer component 616 based on the first time information associated with the video content, which can indicate the particular part of the video content that was captured at or near the particular time that the defined event occurred, and the second time information associated with the second audio content, wherein the second time information can indicate when the defined event occurred. The analyzer component 616 can employ image analysis on the particular part of the video content, analysis of sensor information related to the particular part of the video content and received from one or more sensors associated with the device 202, or another analysis on or related to the particular part of the video content to facilitate determining the second direction that the image capture component 208 was facing when capturing the particular part of the video content, as more fully described herein. The media management component 614 can determine the second direction that the image capture component 208 was facing when capturing the particular part of the video content, and can determine whether the particular part of the video content contains the event-related video content, based on results of the analysis of the particular part of the video content, as more fully described herein.

In some instances, to facilitate determining whether the particular part of the video content contains the event-related video content, the media management component 614 also can utilize results of analysis relating to other video content (e.g., the second video content and/or the third video content) by the analyzer component 616. For instance, the media management component 614 can determine that the second video content or the third video content indicates that a particular landmark (e.g., a particular venue) is related to the defined event (e.g., the defined event occurred in front of the particular venue). The media management component 614 can determine that the image capture component 208 of the device 202 was facing the particular landmark (e.g., from a perspective that can provide video that can be relevant to the defined event) when the particular part of the video content was captured by the image capture component 208, and can determine that the particular part of the video content contains the event-related video content, based on the results of the analysis of the particular part of the video content and the analysis of the second video content and/or the third video content.

In response to the media management component 614 determining that the event-related video content exists in the particular video content, the emphasizer component 618 can be employed to generate and present (e.g., communicate to the display component 620) an indicator (e.g., the match indicator) that can indicate that the particular video content contains the event-related video content. The display component 620 can facilitate presenting (e.g., displaying) the indicator by or in proximity to one or more display screens of the display component 620 that, for example, are presenting the event-related video content. The display component 620 can comprise a set of display sub-components, such as, for example, a first display sub-component 630 (first display sub-c. 630) that can comprise a first display screen 632, a second display sub-component 634 (second display sub-c. 634) that can comprise a second display screen 636, and a third display sub-component 638 (third display sub-c. 638) that can comprise a third display screen 640. The set of display sub-components (e.g., 630, 634, and/or 638) can be employed to present (e.g., display) visual information, including, for example, the first video content, the second video content, the third video content, indicators (e.g., the match indicator), and/or other video content. The set of display sub-components (e.g., 630, 634, and/or 638) and/or an audio component (not shown) associated therewith can present audio information, including, for example, the first audio content, the second audio content, the third audio content, audio indicators (e.g., the match indicator in audio form), and/or other audio content.

Figure 7:
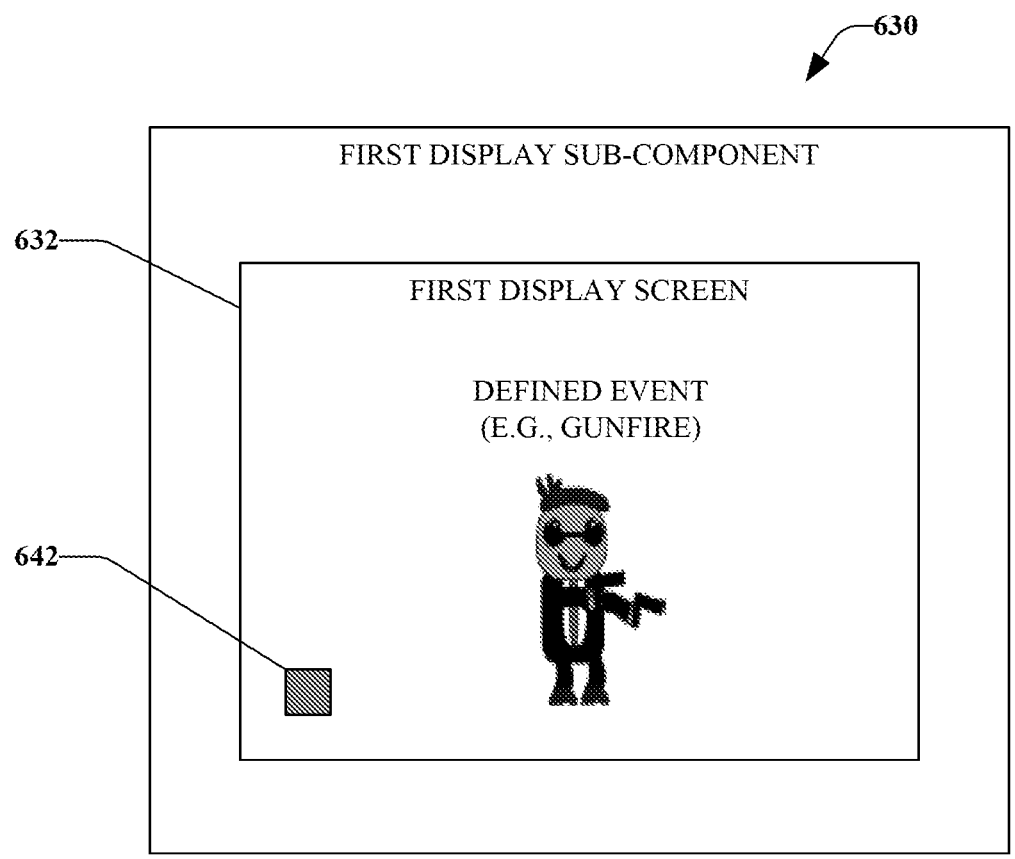
FIG. 7 depicts an example, non-limiting embodiment of a first display sub-component that can display video on a first display screen and/or present audio associated with events and display an indicator in connection with displaying event-related video content, in accordance with various aspects and embodiments of the disclosed subject matter.

Referring briefly to FIG. 7 (along with FIG. 6), FIG. 7 depicts an example, non-limiting embodiment of the first display sub-component 630 that can display video on the first display screen 632 and/or present audio associated with events and display an indicator in connection with displaying the event-related video content, in accordance with various aspects and embodiments of the disclosed subject matter. For instance, in response to determining the first video content received from the device 202 contains the event-related video content relating to the defined event, the media management component 614 can facilitate having the first display screen 632, or another portion, of the first display sub-component 630, present an indicator 642 (e.g., the match indicator), for example, in connection with presenting the first video content and/or the first audio content via the first display sub-component 630 and/or the audio component. The indicator 642 can indicate that the first video content contains the event-related video content. As an example, during display of the first video content by the first display sub-component 630, the emphasizer component 618 and/or the first display sub-component 630 can facilitate presenting the indicator 642 while the first video content is being presented by the first display sub-component 630. The presentation of the indicator 642 via the first display sub-component 630 can occur at, near, or during a particular period of time that the event-related video content is being presented by the first display sub-component 630. The presentation of the indicator 642 can facilitate notifying the monitoring user who is monitoring the set of display sub-components (e.g., 630, 634, and/or 638) that the first video content comprises the event-related video content and/or what portion of the first video content comprises the event-related video content.

With further regard to FIG. 6, in response to determining that the particular video content (e.g., the second video content, or the third video content) does not contain the event-related video content, no indicator (e.g., no match indicator) can be presented on a particular display sub-component (e.g., the second display sub-component 634, or the third display sub-component 638) or a different indicator (e.g., a negative or non-match indicator) can be presented via the particular display sub-component. In some embodiments, the emphasizer component 618 can generate different types of indicators (e.g., the first relevance indicator, the second relevance indicator, and/or the third relevance indicator) to indicate different levels of meaningfulness, significance, or relevance of the particular video content. For instance, the emphasizer component 618 can generate the different types of indicators based on whether the particular video content satisfies the defined threshold amount of time (or not), or whether the particular video content satisfies the alternate defined threshold amount of time (or not), but does not satisfy the defined threshold amount of time, as more fully described herein. The media management component 614 or the emphasizer component 618 can associate the appropriate relevancy indicator (e.g., the first relevancy indicator, the second relevance indicator, or the third relevance indicator) with the particular video content. The media management component 614 and/or the display component 620 can facilitate presenting the appropriate relevancy indicator with or in connection with the particular video content (e.g., by the particular display sub-component).

The media monitoring system 602 also can comprise a selector component 644 that can select (e.g., automatically), or can receive input information (e.g., selection information) that selects, one or more of the respective video content (e.g., the first video content, the second video content, and/or the third video content). The selection of the one or more of the respective video content can occur, for example, in response to the media management component 614 determining that the one or more of the respective video content contains the event-related video content relating to the defined event. In response to the selection of the one or more of the respective video content, the media management component 614 can facilitate taking one or more actions with regard to the one or more of the respective video content (and/or one or more of respective audio content). For example, the media management component 614 can facilitate storing the one or more of the respective video content (and/or one or more of respective audio content) in a particular folder (e.g., a match folder) in the at least one memory 608. Additionally or alternatively, the media management component 614 can facilitate moving the one or more of the respective video content to a larger display sub-component(s) (e.g., having a larger display screen) of the display component 620 to facilitate enhanced viewing of the one or more of the respective video content. Further, additionally or alternatively, the media management component 614 can facilitate flagging the one or more of the respective video content (and/or the one or more of respective audio content) for further review by the monitoring user. Additionally or alternatively, the media management component 614 can facilitate performing further analysis (e.g., a more detailed analysis) on the one or more of the respective video content (and/or the one or more of respective audio content). Additionally or alternatively, the media management component 614 can facilitate performing one or more other actions with respect to the one or more of the respective video content (and/or the one or more of respective audio content).

As a non-limiting example, in connection with a vehicle accident, the media monitoring system 602 can receive a number of videos, which may or may not be relevant to the vehicle accident, from a number of devices, such as the device 202, the second device 604, and the third device 606, which may be integrated with respective vehicles. For instance, the device 202 can capture the first video content and/or the first audio content, the second device 604 can capture the second video content and/or the second audio content, and the third device 606 can capture the third video content and/or the third audio content, which, again, may or may not be relevant to the vehicle accident. The device 202, the second device 604, and/or the third device 606 can be (or may not be) operating in the respective vehicles near a site of the vehicle accident and in a direction of the site at or near a time when the vehicle accident occurs.

The media management component 614, the analyzer component 616, and the other components of the media monitoring system 602 can employ the techniques, operations, and functions, such as described herein, to determine whether the defined event exists in the first audio content, the second audio content, and/or the third audio content. The media management component 614, the analyzer component 616, and the other components of the media monitoring system 602 can employ the techniques, operations, and functions, such as described herein, to determine whether the event-related video content (e.g., video showing the vehicle accident and/or events that occurred immediately prior to the vehicle accident) is contained in the first video content, the second video content, and/or the third video content.

The media management component 614, employing the emphasizer component 618, can facilitate presenting the indicator 642 (e.g., the match indicator) on the display component 620 on or in proximity to the event-related video content (e.g., can present the indicator 642 on or near the first video content, when it is determined that the first video content comprises the event-related video content). Additionally or alternatively, the media management component 614 or the selector component 644 can facilitate selecting such content (e.g., the first video content) that comprises the event-related video content (e.g., for further review by the monitoring user).

In accordance with various embodiments, various aspects of the media management component 216, the analyzer component 214, or the other components of the device 202, and/or the media management component 614, the analyzer component 616, or the other components of the media monitoring system 602 can employ various artificial intelligence-based schemes for carrying out various aspects thereof. The various artificial intelligence-based schemes can be employed, for instance, in connection with determining whether certain audio content comprises the defined event and whether certain video content comprises the event-related video content relating to the defined event. For example, a process for determining the surface data can be enabled through an automatic classifier system and/or process. A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis to prognose or infer a result. A support vector machine (SVM) is an example of a classifier that can be employed. The SVM can operate by finding a hypersurface in the space of possible inputs, which hypersurface attempts to split the triggering criteria from the non-triggering events. Other directed and undirected model classification approaches can include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority. The one or more aspects can employ classifiers that are explicitly trained (e.g., through a generic training data) and/or implicitly trained (e.g., by observing user behavior, receiving extrinsic information, employing historical data, etc.). For example, one or more SVMs can be configured through a learning or training phase within a classifier constructor and feature selection module. Thus, the classifier(s) can be used to learn and perform a number of functions as described herein.

Figure 8:
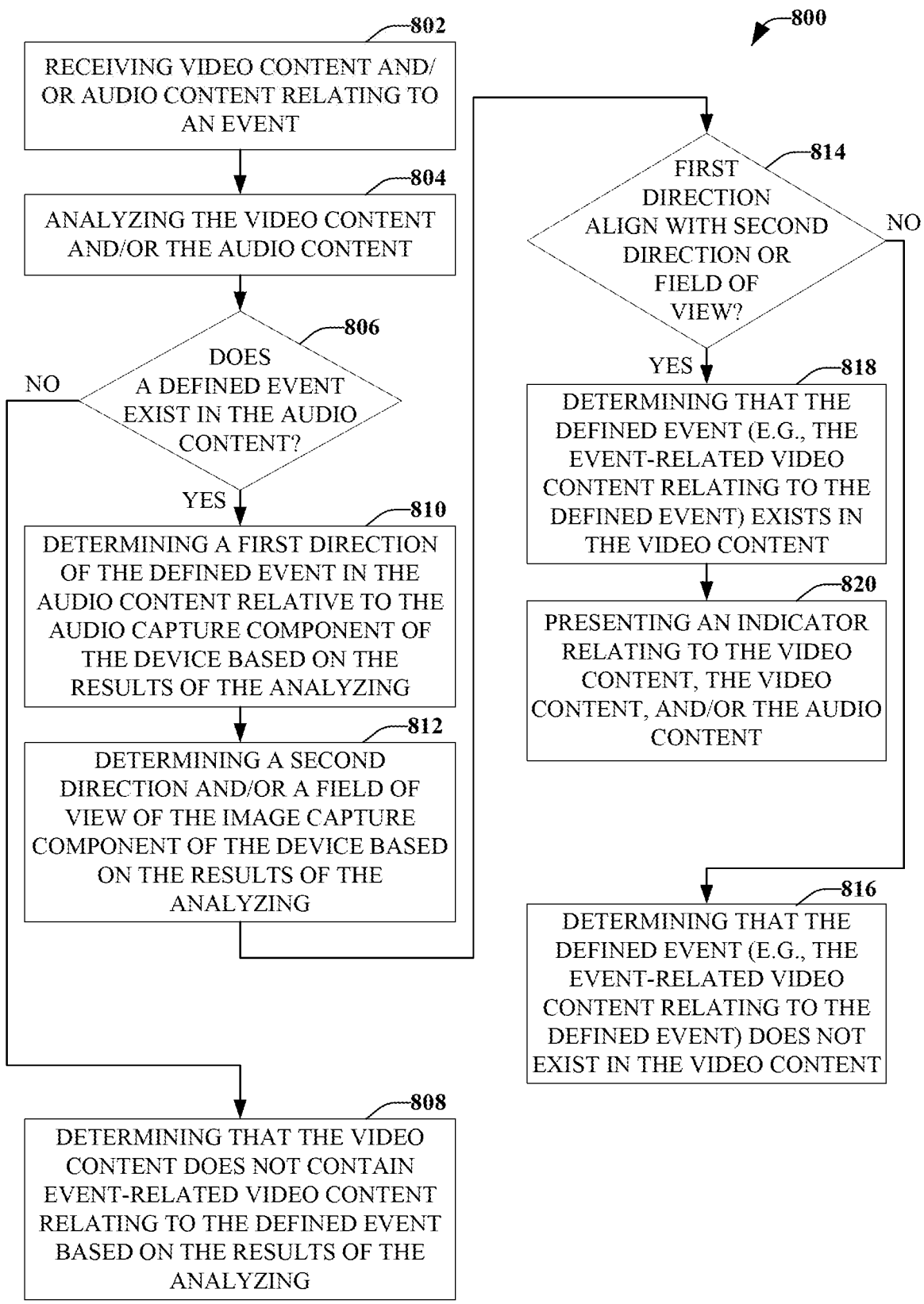
FIG. 8 illustrates a flow diagram illustrating an example, non-limiting embodiment of a method that can manage videos relating to events, in accordance with various aspects and embodiments of the disclosed subject matter.

FIG. 8 is a flow diagram illustrating an example, non-limiting embodiment of a method 800 that can manage videos relating to events, in accordance with various aspects and embodiments of the disclosed subject matter. In accordance with various aspects, the method 800 can be associated with a device. The method 800 in FIG. 8 can be implemented using, for example, any of the systems, such as the system 200 (of FIG. 2), etc., described herein. The method 800 may include one or more operations, functions or actions as illustrated by one or more of blocks 802, 804, 806, 808, 810, 812, 814, 816, 818, and/or 820.

At block 802, video content and/or audio content relating to an event can be received (e.g., captured). The video content relating to the event can be received by an image capture component the device and/or the audio content relating to the event can be received by an audio capture component of the device. Block 802 may be followed by block 804.

At block 804, the video content and/or the audio content can be analyzed. Block 804 may be followed by block 806.

At block 806, a determination can be made regarding whether a defined event relating to the event exists in the audio content based on results of the analyzing at block 804. The defined event can comprise, for example, gunfire, an explosion, a vehicle collision, a scream by a person, a noise relating to a physical attack on the person, or another significant, meaningful, or relevant event. Block 806 may be followed by block 808 or block 810.

If, at block 806, it is determined that the defined event does not exist in the audio content, at block 808, it can be determined that the video content does not contain event-related video content relating to the defined event. If it is determined that the defined event does not exist in the audio content it can be determined that the video content is not meaningful, significant, or relevant (e.g., does not contain the event-related video content relating to the defined event) with regard to the event.

If, at block 806, it is determined that the defined event exists in the audio content, at block 810, a first direction of the defined event in the audio content relative to the audio capture component of the device can be determined based on the results of the analyzing. Block 810 may be followed by block 812.

At block 812, a second direction and/or a field of view of the image capture component of the device can be determined based on the results of the analyzing at block 804. The second direction and/or the field of view with respect to where the image capture component was facing at or near a time of the defined event can be determined based on the results of the analyzing at block 804. Block 812 may be followed by block 814.

At block 814, a determination can be made regarding whether the first direction aligns or substantially aligns with the second direction and/or the field of view (e.g., with respect to a defined period of time, such as a time at or near (e.g., immediately or almost immediately prior to) the time of the defined event). The first direction can be compared to the second direction and/or the field of view to determine whether the first direction aligns or substantially aligns with the second direction and/or the field of view. Block 814 may be followed by block 816 or block 818.

If, at block 814, it is determined that the first direction does not align or substantially align with the second direction and/or the field of view, at block 816, it can be determined that the defined event (e.g., the event-related video content) does not exist in the video content. If, at block 814, it is determined that the first direction does align or substantially align with the second direction and/or the field of view, at block 818, it can be determined that the defined event (e.g., the event-related video content relating to the defined event) exists in the video content. Block 818 may be followed by block 820.

At block 820, an indicator (e.g., a match indicator) relating to the video content and/or the video content and/or the audio content can be presented. The indicator can be presented to, for example, a user of the device to notify the user that the video content contains, and/or what portion of the video contains, the event-related video content. Additionally or alternatively, the video content, the audio content, and/or the indicator can be presented (e.g., communicated) to a media monitoring system via a wired or wireless communication connection.

Figure 9:
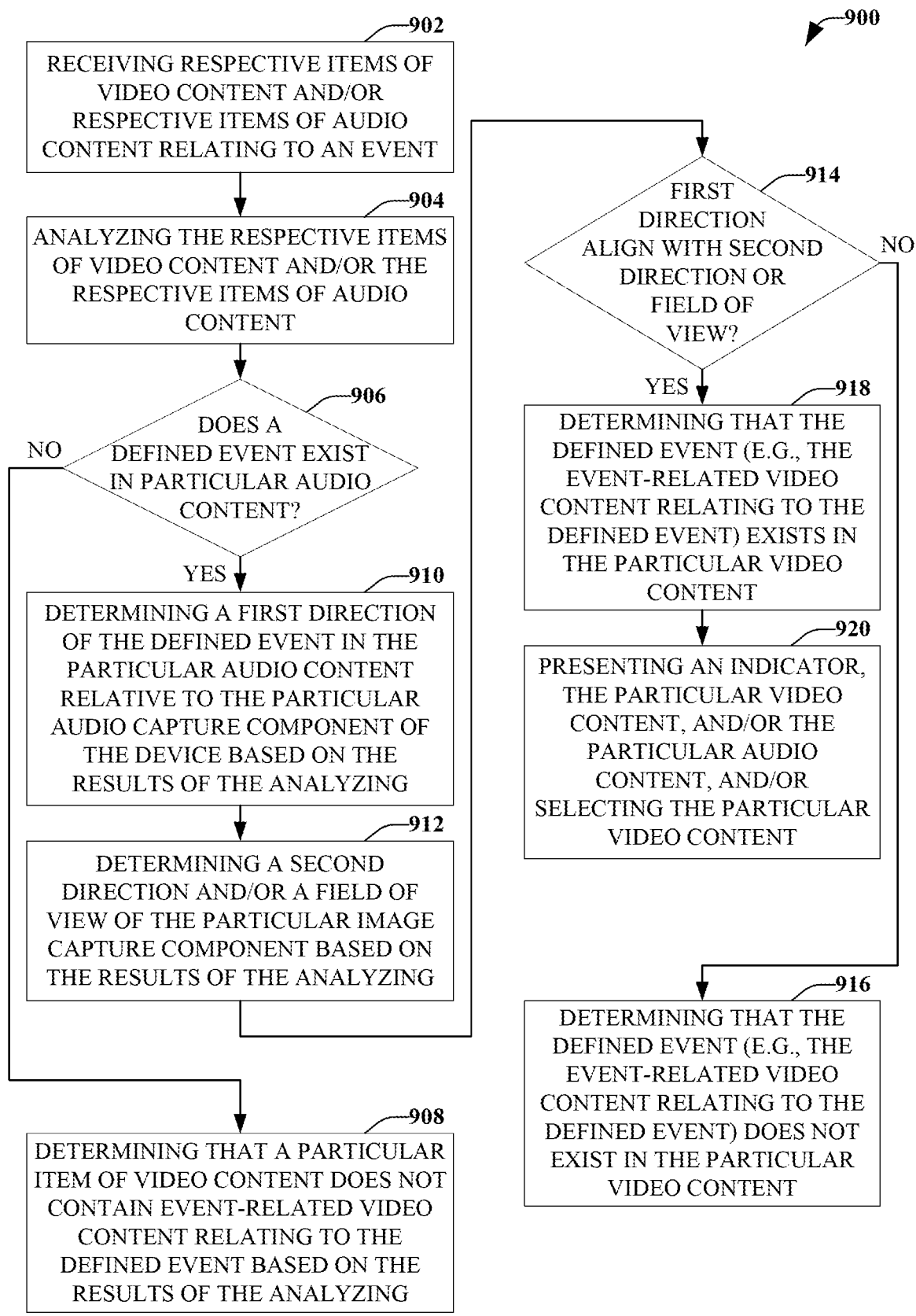
FIG. 9 illustrates a flow diagram illustrating another example, non-limiting embodiment of a method that can manage videos relating to events, in accordance with various aspects and embodiments of the disclosed subject matter.

FIG. 9 depicts a flow diagram illustrating another example, non-limiting embodiment of a method 900 that can manage videos relating to events, in accordance with various aspects and embodiments of the disclosed subject matter. In accordance with various aspects, the method 900 can be associated with a media monitoring system. The method 900 in FIG. 9 can be implemented using, for example, any of the systems, such as the system 200 (of FIG. 2), the system 600 (of FIG. 6), etc., described herein. The method 900 may include one or more operations, functions or actions as illustrated by one or more of blocks 902, 904, 906, 908, 910, 912, 914, 916, 918, and/or 920.

At block 902, respective items of video content and/or respective items of audio content relating to an event can be received. The respective items of video content relating to the event and/or the respective items of audio content relating to the event can be received from respective devices by the media monitoring system, which, at various times, can be connected, via a wired or wireless communication connection, to the respective devices. Block 902 may be followed by block 904.

At block 904, the respective items of video content and/or the respective items of audio content can be analyzed. Block 904 may be followed by block 906.

At block 906, a determination can be made regarding whether a defined event (e.g., gunfire, an explosion, a vehicle collision, . . . ) relating to the event exists in one or more of the respective items of audio content based on results of the analyzing at block 904. Block 906 may be followed by block 908 or block 910.

For each of the respective items of audio content, with respect to a particular item of audio content received from a particular device of the respective devices, if, at block 906, it is determined that the defined event does not exist in the particular item of audio content, at block 908, it can be determined that a particular item of video content (e.g., corresponding to the particular item of audio content) does not contain event-related video content relating to the defined event. If it is determined that the defined event does not exist in the particular item of audio content it can be determined that the particular video content is not meaningful, significant, or relevant (e.g., does not contain the event-related video content relating to the defined event) with regard to the event.

If, at block 906, it is determined that the defined event exists in the particular audio content, at block 910 (with respect to one or more of the respective items of audio content for which it was determined that the defined event exists therein), a first direction of the defined event in the particular audio content relative to a particular audio capture component of the particular device can be determined based on the results of the analyzing at block 904. Block 910 may be followed by block 912.

With respect to one or more of the respective items of video content associated with the one or more of the respective items of audio content for which it was determined that the defined event exists therein, at block 912, a second direction and/or a field of view of a particular image capture component of the particular device can be determined based on the results of the analyzing at block 904. The second direction and/or the field of view with respect to where the particular image capture component was facing at or near a time of the defined event can be determined based on the results of the analyzing. Block 912 may be followed by block 914.

With respect to each of the one or more of the respective items of video content, and, correspondingly, each of the one or more of the respective items of audio content, at block 914, a determination can be made regarding whether the first direction aligns or substantially aligns with the second direction and/or the field of view (e.g., with respect to a defined period of time). The defined period of time can be a time at or near (e.g., immediately or almost immediately prior to) the time of the defined event. The first direction can be compared to the second direction and/or the field of view to determine whether the first direction aligns or substantially aligns with the second direction and/or the field of view. Block 914 may be followed by block 916 or block 918.

With respect to each of the one or more of the respective items of video content, and, correspondingly, each of the one or more of the respective items of audio content, if, at block 914, it is determined that the first direction does not align or substantially align with the second direction and/or the field of view, at block 916, it can be determined that the defined event (e.g., event-related video content relating to the defined event) does not exist in the particular video content. With respect to each of the one or more of the respective items of video content, and correspondingly, each of the one or more of the respective items of audio content, if, at block 914, it is determined that the first direction does align or substantially align with the second direction and/or the field of view, at block 918, it can be determined that the defined event (e.g., the event-related video content) does exist in the particular video content. Block 918 may be followed by block 920.

With respect to each of the one or more of the respective items of video content, and/or, correspondingly, each of the one or more of the respective items of audio content, at block 920, an indicator (e.g., a match indicator) relating to the particular video content, the particular video content, and/or the particular audio content can be presented, and/or the particular video content can be selected. The indicator can be presented, via a display screen of a display component or another component (e.g., an indicator component in proximity to the display screen) to, for example, a monitoring user (associated with the media monitoring system) who is monitoring the respective items of video content. The indicator can facilitate notifying the monitoring user that the particular video content contains, and/or what portion of the particular video content contains, the event-related video content. The particular video content, the particular audio content, and/or the particular indicator can be presented (e.g., to the monitoring user) via the display component and/or an audio component associated therewith. Additionally or alternatively, the particular video content can be selected (e.g., for further viewing, review, or analysis).

Figure 10:
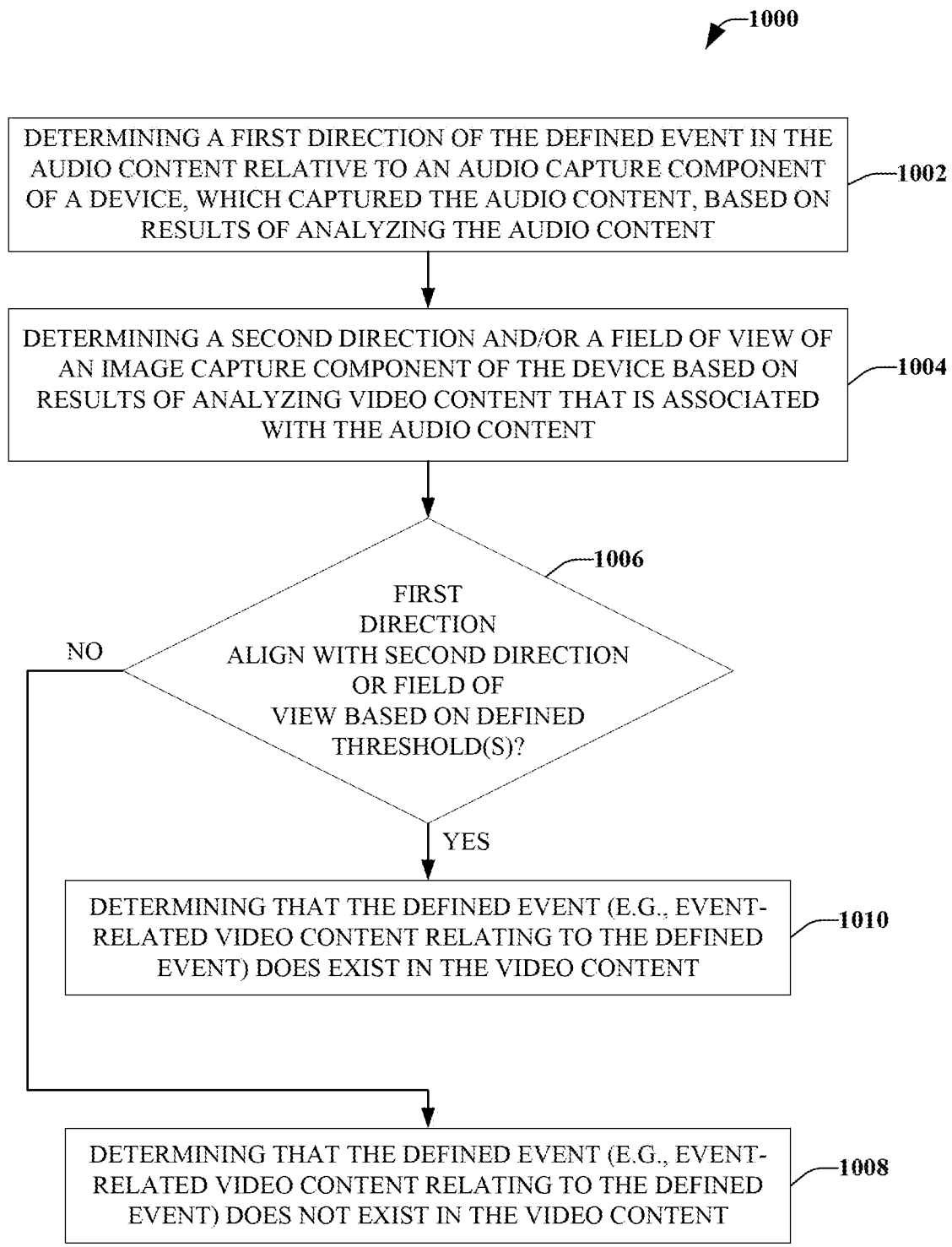
FIG. 10 illustrates a flow diagram illustrating an example, non-limiting embodiment of a method that can employ a time-related threshold(s) to facilitate managing videos relating to events, in accordance with various aspects and embodiments of the disclosed subject matter.

FIG. 10 is a flow diagram illustrating an example, non-limiting embodiment of a method 1000 that can employ a time-related threshold(s) to facilitate managing videos relating to events, in accordance with various aspects and embodiments of the disclosed subject matter. In an aspect, the method 1000 can be associated with a device or a media monitoring system. The method 1000 in FIG. 10 can be implemented using, for example, any of the systems, such as the system 200 (of FIG. 2), the system 600 (of FIG. 6), etc., described herein. The method 1000 may include one or more operations, functions or actions as illustrated by one or more of blocks 1002, 1004, 1006, 1008, and/or 1010.

At block 1002, with regard to audio content for which it has been determined that a defined event relating to an event exists, a first direction of the defined event in the audio content relative to an audio capture component of a device, which captured the audio content, can be determined based on results of analyzing the audio content. The defined event can comprise, for example, gunfire, an explosion, a vehicle collision, a scream by a person, a noise relating to a physical attack on the person, or another significant, meaningful, or relevant event. Block 1002 may be followed by block 1004.

At block 1004, a second direction and/or a field of view of an image capture component of the device can be determined based on results of analyzing video content that is associated with (e.g., corresponds to) the audio content. The second direction and/or the field of view with respect to where the image capture component was facing at or near a time of the defined event can be determined based on the results of the analyzing of the video content. Block 1004 may be followed by block 1006.

At block 1006, a determination can be made regarding whether the first direction aligns or substantially aligns with the second direction and/or the field of view with respect to a defined period of time based on a defined threshold amount of time and/or a defined threshold percentage of the defined threshold amount of time, in accordance with a defined match criteria, as more fully described herein. The defined period of time can be a time at or near (e.g., immediately or almost immediately prior to) the time of the defined event. The first direction can be compared to (e.g., evaluated with) the second direction and/or the field of view to determine whether the first direction aligns or substantially aligns with the second direction and/or the field of view. In connection with the comparison, the defined threshold amount of time and/or the defined threshold percentage of the defined amount of time can be applied to facilitate determining whether the first direction aligns or substantially aligns with the second direction and/or the field of view with respect to the defined period of time. The defined threshold amount of time and/or the defined threshold percentage of the defined threshold amount of time can relate to the time immediately or almost immediately prior to a time of the defined event. The defined threshold amount of time and/or the defined threshold percentage of the defined amount of time can be determined based on a type of the defined event, for example. Block 1006 may be followed by block 1008 or block 1010.

If, at block 1006, it is determined that the first direction does not align or substantially align with the second direction and/or the field of view, at block 1008, it can be determined that the defined event (e.g., event-related video content relating to the defined event) does not exist in the video content. If, at block 1006, it is determined that the first direction does align or substantially align with the second direction and/or the field of view, at block 1010, it can be determined that the defined event (e.g., the event-related video content relating to the defined event) does exist in the video content.

Figure 11:
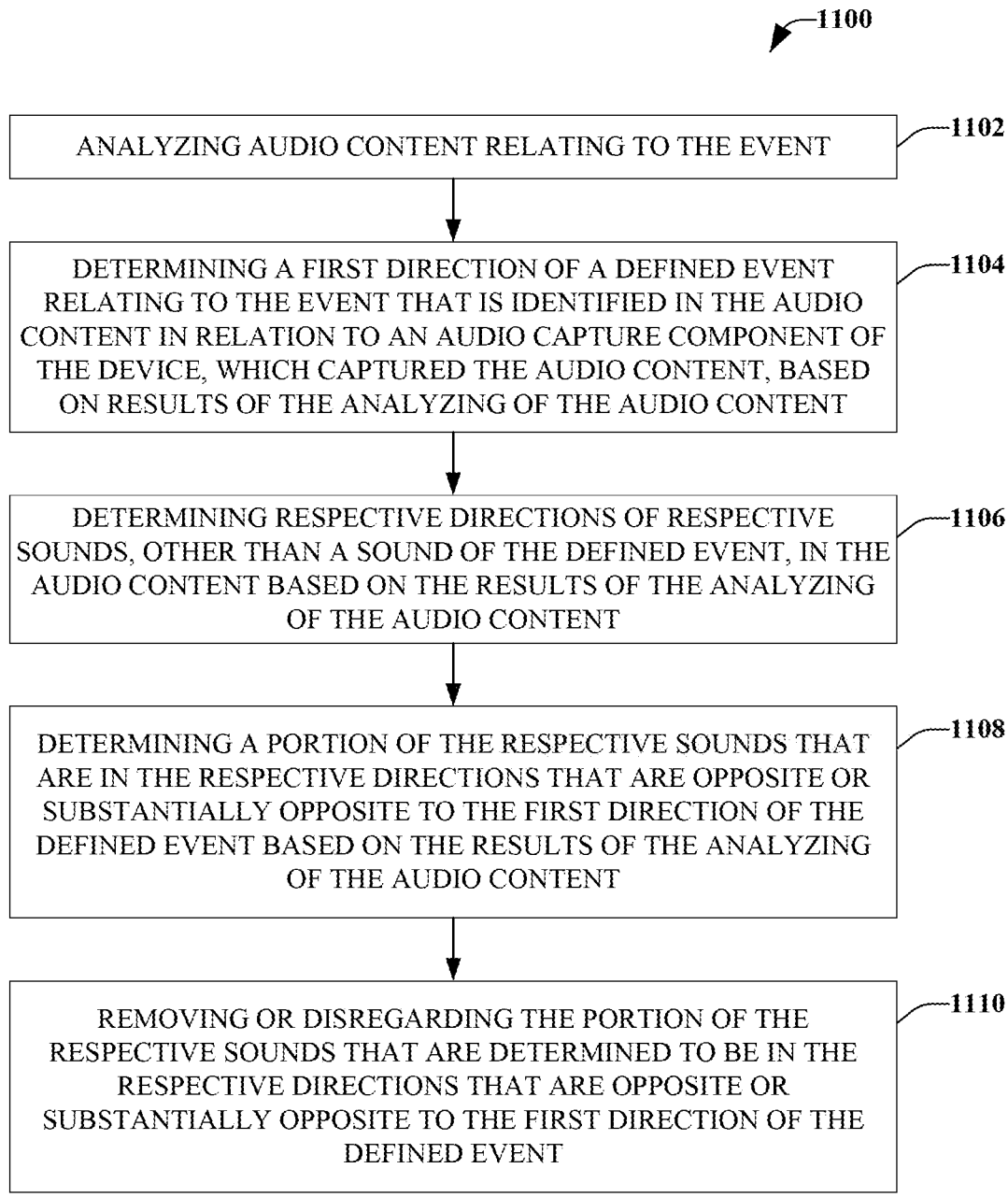
FIG. 11 illustrates a flow diagram illustrating an example, non-limiting embodiment of a method that can facilitate processing audio content relating to video content relating to an event to remove extraneous sounds in the audio content to facilitate managing videos relating to events, in accordance with various aspects and embodiments of the disclosed subject matter.

FIG. 11 is a flow diagram illustrating an example, non-limiting embodiment of a method 1100 that can facilitate processing audio content relating to video content relating to an event to remove extraneous sounds in the audio content to facilitate managing videos relating to events, in accordance with various aspects and embodiments of the disclosed subject matter. In accordance with various aspects, the method 1100 can be associated with or employed by a device or a media monitoring system. The method 1100 in FIG. 11 can be implemented using, for example, any of the systems, such as the system 200 (of FIG. 2), the system 600 (of FIG. 6), etc., described herein. The method 1100 may include one or more operations, functions or actions as illustrated by one or more of blocks 1102, 1104, 1106, 1108, and/or 1110.

At block 1102, the audio content relating to the event can be analyzed. Block 1102 may be followed by block 1104.

At block 1104, a first direction of a defined event (e.g., gunfire, an explosion, a vehicle collision, . . . ) relating to the event that is identified in the audio content in relation to an audio capture component of the device, which captured the audio content, can be determined based on results of the analyzing of the audio content at block 1102. Block 1104 may be followed by block 1106.

At block 1106, respective directions of respective sounds, other than a sound of the defined event, in the audio content can be determined based on the results of the analyzing of the audio content at block 1102. Block 1106 may be followed by block 1108.

At block 1108, a portion of the respective sounds that are in the respective directions that are opposite or substantially opposite to the first direction of the defined event can be determined based on the results of the analyzing of the audio content at block 1102. Block 1108 may be followed by block 1110.

At block 1110, the portion of the respective sounds that are determined to be in the respective directions that are opposite or substantially opposite to the first direction of the defined event can be removed or disregarded. In some embodiments, a beam pattern of a microphone array, comprising microphones of an audio capture component of the device, can be determined and applied to facilitate disregarding, removing, or masking out the extraneous sounds from the audio content to facilitate the analyzing of the audio content and determining whether the defined event exists in the audio content and/or determining the first direction of the defined event in the audio content.

Figure 12:
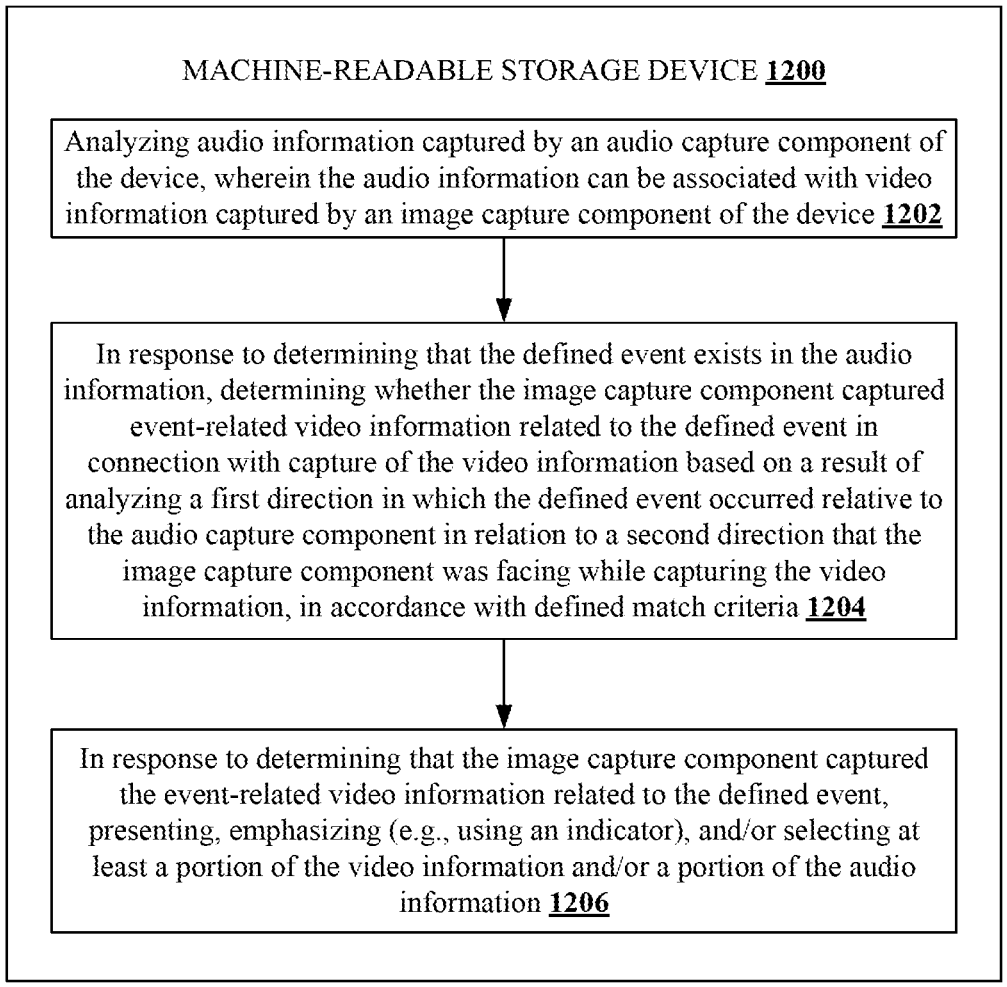
FIG. 12 illustrates a flow diagram of an example, non-limiting embodiment of a set of operations to manage and/or generate sensor data.

FIG. 12 illustrates a flow diagram of an example, non-limiting embodiment of a set of operations that can manage videos relating to events, in accordance with various aspects and embodiments of the disclosed subject matter. The machine-readable storage device 1200 (e.g., a computer-readable storage device) can comprise executable instructions that, in response to execution, cause a system comprising a processor to perform operations. The set of operations can include one or more operations, functions or actions as is illustrated by one or more of operations 1202, 1204, and/or 1206, and/or other operations. In accordance with various aspects, the machine-readable storage device 1200 can be associated with or employed by a device or a media monitoring system.

At operation 1202, audio information, comprising audio content, captured by an audio capture component of the device, can be analyzed, wherein the audio information can be associated with video information, comprising video content, captured by an image capture component of the device. The audio information can be analyzed to facilitate determining whether a defined event exists (e.g., is present) in the audio content. The defined event can comprise, for example, gunfire, an explosion, a vehicle collision, a scream by a person, a noise relating to a physical attack on the person, or other type of event that can be considered meaningful, significant, or relevant to a user and/or an entity. The defined event (e.g., a key or significant event) can be detected, for example, by analyzing, in the audio content, a pattern of features (e.g., characteristics, or attributes), such as the STE value, the ZCR, the LPC coefficient, or the MFCC, associated with the audio content. Operation 1202 may be followed by operation 1204.

At operation 1204, in response to determining that the defined event exists in the audio information based on a result of the analyzing of the audio information, a determination can be made regarding whether the image capture component captured event-related video information related to the defined event in connection with capture of the video information based on a result of analyzing a first direction in which the defined event occurred relative to the audio capture component in relation to a second direction that the image capture component was facing while capturing the video information, in accordance with defined match criteria. The determining whether the image capture component captured the event-related video information can be performed to facilitate determining whether to present, emphasize (e.g., present an indicator, such as a match indicator, relating to), or select the video information and/or audio information relating to the defined event. As part of the analyzing of the audio information, the first direction in which the defined event occurred relative to the audio capture component can be determined or estimated using desired techniques (e.g., determining the TDOA, or triangulating the source of the sound associated with the defined event), as more fully described herein.

The video information can be analyzed to determine the second direction that the image capture component was facing while receiving or capturing the video information. A field of view of the image capture component (e.g., the field of view of one or more lenses of the image capture component) can be determined (e.g., with respect to the second direction) based on a result of the analyzing of the video information. The first direction in which the defined event occurred relative to the audio capture component can be compared to the second direction and/or the field of view to determine whether the defined event occurred within the field of view of the image capture component. If the first direction is within the field of view of the image capture component, it can be determined that the image capture component captured the event-related video information related to the defined event in connection with capture of the video information, in accordance with the defined match criteria. If the first direction is not within the field of view of the image capture component, it can be determined that the image capture component did not capture the event-related video information related to the defined event in connection with capture of the video content. Operation 1204 may be followed by operation 1206.

At operation 1206, in response to determining that the image capture component captured the event-related video information related to the defined event, at least a portion of the video information, comprising the event-related video information, and/or a portion of the audio information, comprising event-related audio information, can be presented, emphasized (e.g., using an indicator), or selected. The indicator, which can be, for example, a match indicator, can be presented in connection with the portion of the video information. For instance, in response to determining that the image capture component captured the event-related video information related to the defined event, the device can present (e.g., transmit) at least the portion of the video information, comprising the event-related video information, and/or the portion of the audio information, comprising the event-related audio information, to the media monitoring system, which can receive (e.g., collect) videos relating to the defined event from various devices, such as the device.

As another example, with regard to the media monitoring system, in response to determining that the image capture component captured the event-related video information related to the defined event in connection with capture of the video information, the media monitoring system can present (e.g., display) at least the portion of the video information, comprising the event-related video information, and/or present the portion of the audio information. Additionally or alternatively, the media monitoring system can present the indicator, on a display component of the media monitoring system, which can receive (e.g., collect) videos relating to the defined event from various devices, such as the device.

Additionally or alternatively, in response to determining that the image capture component captured the event-related video content related to the defined event in connection with capture of the video content, the device or the media monitoring system can emphasize the video information (e.g., the video content). For example, the device or the media monitoring system can emphasize the video information by highlighting the video information, or the portion of the video information. As another example, the device can emphasize the video information by presenting the indicator (e.g., the match indicator) that can indicate the video information contains the event-related video information (e.g., the first direction associated with the audio content matches or substantially matches the second direction associated with the video content).

Figure 13:
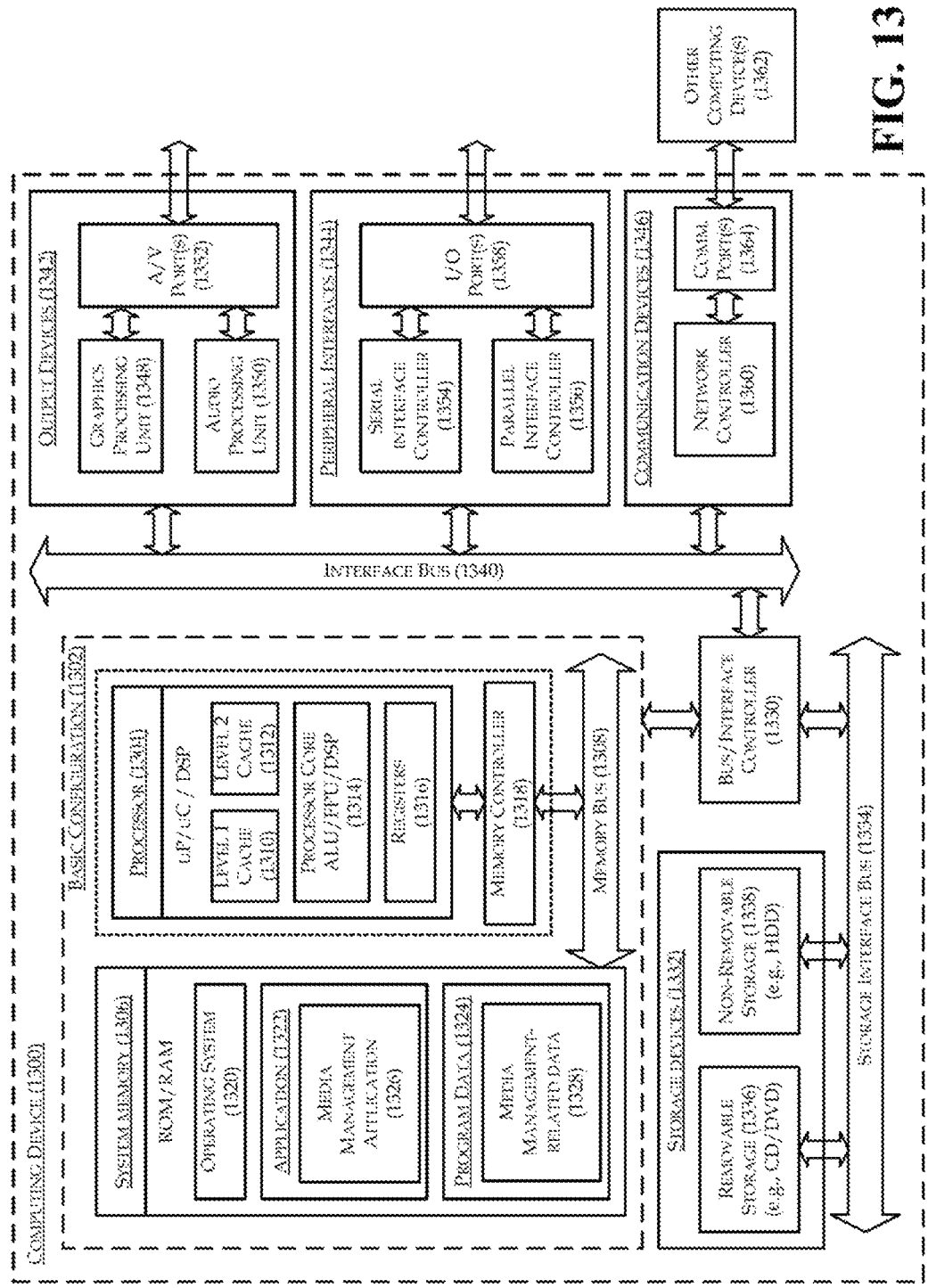
FIG. 13 illustrates an example block diagram of a computing device that is arranged to manage and/or generate sensor data in accordance with one or more embodiments described herein.

FIG. 13 illustrates an example block diagram of a computing device that is arranged to manage video content and/or audio content relating to events, in accordance with one or more embodiments described herein. In a very basic configuration 1302, a computing device 1300 typically can include one or more processors 1304 and a system memory 1306. In some embodiments, the computing device 1300 can be or include the system 200 or the system 600 (or components of the system 200 or the system 600). For example, the computing device 1300 shown in FIG. 13 can be or can include structure and/or functionality associated with the image capture component 208, the display component 210, the audio capture component 212, the analyzer component 214, the media management component 216, the emphasizer component 218, the communicator component 220, and/or any number of other components/modules/devices described herein (e.g., with regard to the system 200). As another example, the computing device 1300 shown in FIG. 13 can be or can include structure and/or functionality associated with the media monitoring system 602, the communicator component 612, the media management component 614, the analyzer component 616, the emphasizer component 618, the display component 620, and/or any number of other components/modules/devices described herein (e.g., with regard to the system 600). In some embodiments, system memory 1306 may be or include the system 200 or the system 600 (or any components of the system 200 or the system 600). A memory bus 1308 may be used for communicating between a processor 1304 and a system memory 1306.

Depending on the desired configuration, a processor 1304 may be of any type including but not limited to a microprocessor (μP), a microcontroller (μC), a digital signal processor (DSP), or any combination thereof. Processor 1304 may include one or more levels of caching, such as a level one cache 1310 and a level two cache 1312, a processor core 1314, and registers 1316. An example processor core 1314 may include an arithmetic logic unit (ALU), a floating point unit (FPU), a DSP core, or any combination thereof. An example memory controller 1318 may also be used with processor 1304, or in some implementations a memory controller 1318 may be an internal part of processor 1304.

Depending on the desired configuration, system memory 1306 may be of any type including but not limited to volatile memory (such as RAM), non-volatile memory (such as ROM, flash memory, etc.) or any combination thereof. System memory 1306 may include an operating system 1320, one or more applications 1322, such as a media management application 1326 and/or another application(s) (e.g., the multimedia application, the user interface application, the controller application, the user input application, the data collection application, the authentication application, the security application), and program data 1324. For example, the media management application 1326 can be or include one or more applications that can cause the computing device 1300 of FIG. 13 to manage video content and/or audio content associated with the method 100, the system 200, the system 600, the method 800, the method 900, the method 1000, or the method 1100, as described herein. The program data 1324 can be or include data, such as media management-related data 1328, which can comprise various types of data (e.g., data relating to a first direction of a defined event in relation to an audio capture component, data relating to a second direction that an image capture component was facing during capture of the video content, data relating to a field of view of an image capture component, data relating to event-related video content, data relating to indicators (e.g., a match indicator), data relating to emphasis of the video content (e.g., the event-related video content), defined match criteria, etc.), employed by the method 100, the system 200, the system 600, the method 800, the method 900, the method 1000, or the method 1100 to manage and/or generate the video content, the audio content, and/or other information associated with the method 100, the system 200, the system 600, the method 800, the method 900, the method 1000, or the method 1100, as described herein. In some embodiments, computing device 1300 may be or be included in the system 200 or the system 600 (or one or more components of the system 200 or the system 600). In some embodiments, an application 1322 may be arranged to operate with program data 1324 on an operating system 1320 such that implementations for managing and/or generating incentive data may be performed as described herein. This described basic configuration 1302 is illustrated in FIG. 13 by those components within the inner dashed line.

Computing device 1300 may have additional features or functionality, and additional interfaces to facilitate communications between basic configuration 1302 and any required devices and interfaces. For example, a bus/interface controller 1330 may be used to facilitate communications between basic configuration 1302 and one or more data storage devices 1332 via a storage interface bus 1334. Data storage devices 1332 may be removable storage devices 1336, non-removable storage devices 1338, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 1306, removable storage devices 1336 and non-removable storage devices 1338 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 1300. Any such computer storage media may be part of computing device 1300.

Computing device 1300 may also include an interface bus 1340 for facilitating communication from various interface devices (e.g., output devices 1342, peripheral interfaces 1344, and communication devices 1346) to basic configuration 1302 via a bus/interface controller 1330. Example output devices 1342 include a graphics processing unit 1348 and an audio processing unit 1350, which may be configured to communicate to various external devices such as a display or speakers via one or more A/V ports 1352. Example peripheral interfaces 1344 include a serial interface controller 1354 or a parallel interface controller 1356, which may be configured to communicate with external devices such as input devices (e.g., keyboard, mouse, pen, voice input device, touch input device, etc.) or other peripheral devices (e.g., printer, scanner, etc.) via one or more I/O ports 1358. An example communication device 1346 includes a network controller 1360, which may be arranged to facilitate communications with one or more other computing devices 1362 over a network communication link via one or more communication ports 1364.

Computing device 1300 may be implemented as a portion of a small-form factor portable (or mobile) electronic device such as a cell phone, a personal digital assistant (PDA), a personal media player device, a wireless web-watch device, a personal headset device, an application specific device, or a hybrid device that include any of the above functions. Computing device 1300 may also be implemented as a personal computer including both laptop computer and non-laptop computer configurations.

A network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

The use of hardware or software may be generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples can be implemented, individually and/or collectively, by a wide range of hardware, software, firmware, or virtually any combination thereof. In one embodiment, several portions of the subject matter described herein can be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be possible in light of this disclosure. In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. A typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems. A typical data processing system can be implemented utilizing any suitable commercially available components, such as those typically found in data computing/communication and/or network computing/communication systems.

The herein described subject matter sometimes illustrates different components contained within, or connected with, different other components. Such depicted architectures are merely examples, and many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations can be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

The present disclosure is not to be limited in terms of the particular embodiments described in this application, which are intended as illustrations of various aspects. Many modifications and variations can be made without departing from its spirit and scope. Functionally equivalent methods and devices within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. This disclosure is not limited to particular methods, computer-readable storage devices, systems or apparatus disclosed, which can, of course, vary. The terminology used herein is for the purpose of describing particular embodiments only, and is not intended to be limiting.

What is claimed is:

1. A method, comprising:
    analyzing, by a device comprising a processor, audio content captured by an audio capture component and associated with video content captured by an image capture component to identify a defined event in the audio content;
    analyzing a first direction in which the identified defined event occurred relative to the audio capture component in relation to a second direction that the image capture component was facing while capturing the video content;
    determining, by the device, whether the image capture component captured event-related video content is related to the defined event based on a result of analyzing the first direction in which the defined event occurred; and
    in response to determining the image capture component captured the event-related video content is related to the defined event,
        presenting, by a display screen of the device, a first portion of the video content or a first portion of the audio content corresponding to the event-related video content.

2. The method of claim 1, further comprising:
    in response to identifying the defined event in the audio content, identifying, by the device, the first direction in which the defined event occurred relative to the audio capture component based on the analyzing of the audio content.

3. The method of claim 2, further comprising:
    comparing, by the device, the second direction that the image capture component was facing to the first direction in which the defined event occurred; and
    determining, by the device, whether the image capture component captured the event-related video content is related to the defined event based on a comparison result of the comparing.

4. The method of claim 1, wherein the analyzing the audio content comprises analyzing a first portion of the audio content captured by a first audio sensor of the audio capture component and a second portion of the audio content captured by a second audio sensor of the audio capture component, and wherein the method further comprises:
    identifying, by the device, the first direction in which the defined event occurred based on a time difference between capture of the first portion of the audio content and capture of at least the second portion of the audio content.

5. The method of claim 1, wherein the analyzing the audio content comprises analyzing a first portion of the audio content captured by a first audio sensor of the audio capture component, a second portion of the audio content captured by a second audio sensor of the audio capture component, and a third portion of the audio content captured by a third audio sensor of the audio capture component, and wherein the method further comprises:
    identifying, by the device, the first direction in which the defined event occurred by triangulating a source of a sound associated with the defined event in the audio content based on the analyzing of the first portion, the second portion, and the third portion of the audio content.

6. The method of claim 1, further comprising:
    identifying, by the device, the second direction that the image capture component was facing while capturing the video content;
    determining, by the device, a field of view of the image capture component; and
    comparing, by the device, the field of view of the image capture component to the first direction in which the defined event occurred to facilitate determining whether the first direction is within the field of view of the image capture component.

7. The method of claim 1, further comprising:
in response to determining the image capture component captured the event-related video content is related to the defined event, presenting, by the device, an indicator on the display screen, wherein the indicator indicates the video content comprises the event-related video content.

8. The method of claim 1, further comprising:
in response to determining the image capture component captured the event-related video content is related to the defined event, determining, by the device, an amount of time, prior to the defined event occurring, that the image capture component was at least substantially facing the second direction;
determining, by the device, whether the amount of the time satisfies a defined threshold amount of time related to a type of event; and
in response to determining the amount of the time satisfies the defined threshold amount of time, presenting or selecting, by the device, the video content or the audio content.

9. The method of claim 1, wherein the analyzing the audio content comprises analyzing sounds in the audio content other than different sounds that are received from a third direction that is substantially opposite to the second direction that the image capture component was facing while capturing the video content.

10. The method of claim 1, wherein the analyzing the audio content comprises analyzing a pattern of characteristics of the audio content to facilitate determining whether the defined event exists in the audio content, and wherein the characteristics comprise at least one of a short-time energy value, a zero-crossing rate, a linear predictive coding coefficient, or a mel-frequency cepstral coefficient, associated with the audio content.

11. The method of claim 1, further comprising:
in response to determining the image capture component captured the event-related video content is related to the defined event,
transmitting to be presented, through the communicator component, the first portion of the video content or the first portion of the audio content corresponding to the event-related video content.

12. A system, comprising:
a memory operable to store executable components;
a display screen;
a communicator component; and
a processor, coupled to the memory, the display screen, and the memory, the processor operable to execute or facilitate execution of one or more of the executable components, the executable components comprising:
an analyzer component configured to:
analyze audio content captured by an audio capture component and associated with video content captured by an image capture component to identify a defined event in the audio content; and
analyze a first direction in which the identified defined event occurred relative to the audio capture component in relation to a second direction that the image capture component was facing while capturing the video content; and
a media management component configured to:
determine whether the image capture component captured event-related video content is related to the identified defined event based on a result of analyzing the first direction in which the defined event occurred relative to the audio capture component; and
in response to determining the image capture component captured the event-related video content is related to the defined event,
presenting, through the display screen, or transmitting to be presented, through the communicator component, a first portion of the video content or a first portion of the audio content corresponding to the event-related video content.

13. The system of claim 12, wherein, in response to the identification of the defined event in the audio content, the media management component is configured to determine the first direction in which the defined event occurred relative to the audio capture component based on the analysis of the audio content, evaluate the second direction that the image capture component was facing in relation to the first direction in which the defined event occurred, and determine whether the image capture component captured the event-related video content is related to the defined event based on an evaluation result of the evaluation.

14. The system of claim 12, wherein the analyzer component is configured to analyze a first portion of the audio content captured by a first audio sensor of the audio capture component and at least a second portion of the audio content captured by at least a second audio sensor of the audio capture component, and
wherein, based on the analysis of the first portion and at least the second portion of the audio content, the media management component is configured to estimate the first direction in which the defined event occurred at least one of based on a time difference between capturing of the first portion of the audio content and capturing of at least the second portion of the audio content, or based on a triangulation of a source of a sound associated with the defined event contained in the audio content that is determined using the first portion of the audio content and at least the second portion of the audio content.

15. The system of claim 12, wherein the media management component is configured to determine the second direction that the image capture component was facing while capturing the video content, and determine a defined area that defines a field of view of the image capture component.

16. The system of claim 15, wherein the media management component is configured to compare the defined area that defines the field of view of the image capture component to the first direction in which the defined event occurred to facilitate determining whether the first direction is within the defined area that defines the field of view of the image capture component.

17. The system of claim 16, wherein the media management component is configured to determine that the first direction corresponds to the second direction based on a comparison result that indicates that the first direction is within the defined area that defines the field of view of the image capture component, or determine that the first direction does not correspond to the second direction based on a different comparison result that indicates that the first direction is not within the defined area that defines the field of view of the image capture component.

18. The system of claim 12, wherein the executable components further comprise an emphasizer component, wherein, in response to a determination that the image capture component captured the event-related video content related to the defined event, the emphasizer component is configured to at least one of generate an indicator that is displayed on the display screen or highlight the event-related video content, and wherein the indicator indicates the video content comprises the event-related video content.

19. The system of claim 12, wherein the executable components further comprise a communicator component configured to receive respective items of video content and respective items of audio content from respective devices in connection with a location associated with the defined event, wherein the analyzer component is configured to analyze the respective items of video content and the respective items of audio content, and wherein the respective items of video content and the respective items of audio content associated with the respective devices comprise a first item of video content and a first item of audio content associated with a first device of the respective devices and a second item of video content and a second item of audio content associated with a second device of the respective devices different than the first device.

20. The system of claim 19, wherein the video content is the first item of video content and the audio content is the first item of audio content, and wherein, in response to a determination that the defined event exists in the first item of audio content and the second item of audio content, the media management component is configured to determine whether a second image capture component of the second device captured second event-related video content relating to the defined event in connection with capture of the second item of video content based on a result of analyzing a third direction in which the defined event occurred with respect to a second audio capture component of the second device in relation to a fourth direction that the second image capture component was facing while capturing the second item of video content, in accordance with a defined match criterion.

21. The system of claim 20, wherein the first device comprises the video capture component and the audio capture component, wherein, in response to a first determination that the video capture component captured the event-related video content of the first item of video content and a second determination that the second video capture component did not capture the second event-related video content in connection with capturing the second item of content, the media management component is configured to at least one of select at least a portion of the first item of video content comprising the event-related video content for presentation or present an indicator in connection with at least the portion of the first item of video content, and wherein the indicator facilitates indicating that at least the portion of the first item of video content comprises the event-related video content due to the first direction associated with the first item of audio content substantially corresponding to the second direction associated with the first item of video content.

22. A machine-readable storage device comprising executable instructions that, in response to execution, cause a system comprising a processor to perform operations, the operations comprising:
analyzing audio information captured by an audio capture component and associated with video information captured by an image capture component to identify a defined event in the audio content;
analyzing a first direction in which the identified defined event occurred relative to the audio capture component in relation to a second direction that the image capture component was facing while capturing the video content;
determining, based on analyzing the first direction in which the identified defined event occurred, whether the image capture component captured event-related video information is related to the defined event;
presenting the image capture component captured video content based on the determination; and
indicating the image capture component captured video content as event-related during presentation.

23. The machine-readable storage device of claim 22, wherein the operations further comprise:
identifying the first direction in which the defined event occurred relative to the audio capture component based on the analyzing of the audio information;
comparing the second direction that the image capture component was facing to the first direction in which the defined event occurred; and
determining whether the image capture component captured the event-related video information is related to the defined event based on a comparison result of the comparing.

24. The machine-readable storage device of claim 23, wherein the operations further comprise:
based on a result of determining whether the image capture component captured the event-related video information is related to the defined event, at least one of:
determining whether to present or select at least a portion of the video information that comprises the event-related video information or at least a portion of the audio information, or
determining whether to present a match indicator in connection with the video information.

25. A method, comprising:
analyzing audio content captured by a plurality of audio capture components;
identifying an event in the analyzed audio content from one of the plurality of audio capture components;
identifying a first direction in which the identified event occurred relative to the one of the plurality of audio capture components;
identifying a second direction that an image capture component was facing while capturing video content;
comparing the first direction and the second direction;
determining whether the video content captured by the image capture component is related to the identified event based on the comparison;
presenting through a display component the video content captured by the image capture component based on the determination; and
indicating the video content as event-related during presentation.

26. The method of claim 25, wherein
analyzing the audio content captured by the audio capture component comprises analyzing two or more portions of the audio content captured by two or more audio sensors of the audio capture component; and
identifying the first direction in which the identified event occurred relative to the audio capture component comprises identifying the first direction based on a time difference between capture of the two or more portions of the audio content or triangulation of a source of a sound associated with the identified event in the two or more portions of the audio content.

27. The method of claim 25, further comprising:
determining a field of view of the image capture component; and comparing the field of view of the image capture component to the first direction in which the identified event occurred to facilitate determining whether the first direction is within the field of view of the image capture component.

\* \* \* \* \*